United States Patent [19]
Yoshikawa et al.

[11] Patent Number: 5,150,387
[45] Date of Patent: Sep. 22, 1992

[54] VARIABLE RATE ENCODING AND COMMUNICATING APPARATUS

[75] Inventors: Hidetaka Yoshikawa, Hino; Kimio Miseki, Kawasaki; Masami Akamine, Yokosuka, all of Japan

[73] Assignee: Kabushiki Kaisha Toshiba, Kawasaki, Japan

[21] Appl. No.: 630,911

[22] Filed: Dec. 20, 1990

[30] Foreign Application Priority Data

Dec. 21, 1989 [JP] Japan ................. 1-331875
Dec. 21, 1989 [JP] Japan ................. 1-331876

[51] Int. Cl.$^5$ .................................. H04B 1/66
[52] U.S. Cl. ............................ 375/122; 381/31
[58] Field of Search ................. 375/25, 30, 31, 38, 375/122; 370/84, 118; 381/29, 31; 455/223, 224; 358/133, 314, 336

[56] References Cited

U.S. PATENT DOCUMENTS

| | | | |
|---|---|---|---|
| 4,464,782 | 8/1984 | Beraud et al. | 381/31 |
| 4,535,472 | 8/1985 | Tomcik | 381/31 |
| 4,790,015 | 12/1988 | Callens et al. | 381/31 |
| 4,805,193 | 2/1989 | Mclaughlin et al. | 375/122 |
| 4,899,384 | 2/1990 | Crouse et al. | 381/31 |
| 4,907,277 | 3/1990 | Callens et al. | 375/122 |

*Primary Examiner*—Benedict V. Safourek
*Attorney, Agent, or Firm*—Finnegan, Henderson, Farabow, Garrett and Dunner

[57] ABSTRACT

In a transmitter in the present invention, an input signal is input to a QMF bank 102 where the input signal is divided to a plurality of frequency bands to form corresponding band signals. A distributed bit calculating unit 109 calculates respective bit rates with which the corresponding band signals are encoded on the respective power values of the band signals. Quantizers 104-1, 104-2, ..., 104-n encode the respective band signals at the corresponding bit rates and input the resulting corresponding band codes to a multiplexer unit 111 which incorporates the respective band codes into a cell as an information unit and sends the cell. In a receiver, a cell is decomposed to obtain the respective band codes, which are then dequantized to form the corresponding band signals. These band signals are synthesized to form a signal for the entire band, and the signal for the entire band is output as a decoded signal.

16 Claims, 12 Drawing Sheets

VARIABLE RATE ENCODING AND COMMUNICATING APPARATUS

FIELD OF THE INVENTION

The present invention relates to variable rate encoding and communicating apparatuses which compress voice signals, modem signals, etc., at appropriate rates, divide the resulting bit train into a plurality of bit trains of shorter lengths and sequentially transmit these bit trains.

DESCRIPTION OF THE RELATED ART

In packet communication systems and asynchronous transfer mode (ATM) communication systems, signals of various communication media such as voice signals and image signals are encoded to form a bit train, the resulting bit train is divided into shorter bit trains, which are incorporated into corresponding units called packets or cells, which are then transmitted sequentially.

In encoding such a media signal, the signal is compressed and encoded. In transmitting the signal, a number of packets are transmitted through lines in a time divisional manner, thus enabling effective and efficient use of lines. Because of this feature, these communication systems are preferably used in ISDN and BISDN. Therefore, the research and development of those systems are being actively pursude.

When the network is congested or packets are delayed in the network of the communication system, some of the packets may be discarded. If the packets are discarded, a part of an efficiently compressed and encoded bit train is lost, so that the communication quality is notably deteriorated. Especially, when an ADPCM using adaptive prediction is used as an encoding system, the communication quality is greatly deteriorated when packets are discarded.

An embedded DPCM system is proposed in which deterioration in the communication quality is reduced even when packets are discarded ("Embedded DPCM for variable bit rate transmission", IEEE Trans.. COM-28, 7 pp. 1040–1046 Jul. 1980).

A packet constructing method and protocol which utilizes the characteristics of the embedded DPCM system is proposed in CCITT SGXV III, "Annex to Question X/XV (Speech Packetization) Algorithm and Protocol for Speech Packetization" TD 131, Geneva 6–17, Jun. 1988, in which the embedded ADPCM system is recommended temporarily as G, EMB and as a voice packet communication encoding system, and a voice packet protocol is temporarily recommended as G.PVNP.

A combined use of the embedded DPCM system and the temporarily recommended packet format makes it possible that the communication quality is less degraded if information is discarded in a packet or in units of a bit. However, the the embedded DPCM system is not effective and the communication quality is deteriorated if information is discarded in units of a packet. If one packet is discarded, an encoder at the transmission end becomes asynchronous with a decoder at the reception end, so that deterioration of the communication quality continues long thereafter.

To compensate for a discarded packet unit, an interpolative reproduction method was proposed in which information in the discarded packet is reproduced by interpolating information in the packets positioned before and after the discarded packet. However, in the embedded DPCM system, the interpolation of discarded information using information before and after the discarded information is virtually ineffective and deterioration in the communication quality cannot be avoided.

Quantity of information included in a voice signal varies greatly depending on the lengths of the sound interval and the non-sound interval and the sound level of the signal. Since a voice signal is encoded at a constant bit rate in the embedded DPCM system, the quality of the encoded voice changes from time to time, as a result of which harsh sounds may occur and the encoding efficiency is not necessarily improved. In other words, in the embedded DPCM system, changing the bit rate with time has not positively been considered, and a method of appropriately changing the bit rate and incorporating short bit trains having a substantially constant length into a packet has not been sufficiently studied.

SUMMARY OF THE INVENTION

It is an object of the present invention to provide a variable rate encoding and communicating apparatus which reduces deterioration in the communication quality even when information is discarded in units of a packets to thereby enable a stabilized communication quality with high encoding efficiency.

According to one aspect of the present invention, there is provided a variable rate encoding and communicating apparatus comprising a transmitter and a receiver in which the transmitter comprises means for dividing a signal to be encoded into a plurality of frequency bands to form band signals each having each of the frequency bands; means for calculating electric power values of the band signals, respectively; means for encoding the band signals at corresponding bit rates, respectively; means for calculating the bit rates on the basis of the electric power values of the band signals in a range where the codes respectively corresponding to the band signals are incorporated into an information unit having a fixed length; and means for incorporating the codes respectively corresponding to the band signals, the electric power values of the corresponding band signals, and a time stamp into the information unit having the fixed length and sending the resulting information unit, and the receiver comprises means for decomposing the information unit having the fixed length into the codes respectively corresponding to the band signals, the electric power values of the corresponding band signals, and the time stamp; means for decoding the codes respectively corresponding to the band signals in accordance with the bit rates respectively corresponding to the electric power values of the band signals; means for synthesizing the respective decoded band signals to form a signal for the entire band; means for determining on the basis of the time stamp whether a different information unit is discarded during communication; and means for interpolating and reproducing the signal for the entire band which otherwise had been obtained from the different information unit on the basis of existing information units positioned before and after the different information unit if the different information unit is determined to be discarded.

With this construction, a signal to be encoded is divided into a plurality of band signals, the respective bit rates at which the respective band signals are encoded are calculated on the basis of their power values, and the band signals are encoded on the basis of the corresponding bit rates. Thus, the correlation or redundancy of the signals to be encoded is eliminated and the signals are encoded at increased efficiency.

The bit rate calculating means estimates the signal-to-noise ratio (SNR) of the signal for the entire band synthesized by the synthesizing means in the receiver on the basis of the respective power values of the band signals calculated by the power value calculating means and the respective bit rates at which the respective band signals are encoded, and increases the sample size of the signal to be encoded until the SNR becomes substantially constant.

The SNR of the signals decoded at the reception end is estimated, the sample size is increased such that the SNR is constant, and as a result, the bit rates are controlled. Therefore, the quality of the decoded signals is maintained at a constant level, and the bit rates are changed in correspondence to a change with time in the nature of the signals to be encoded by the control of the bit rates. Thus, the encoding efficiency is further improved.

Unlike the conventional ADPCM, no prediction using the past signals is made and no synchronous control is necessary between the encoder and decoder. Advantageously, encoding the respective information units is made irrespective of the past signals, so that even if any information unit is discarded, this discard does not influence the next information unit. As a result, deterioration in the communication quality due to the discard of the information units is greatly reduced.

According to another aspect of the present invention, there is provided a variable rate encoding and communicating apparatus comprising means for dividing a signal to be encoded into a plurality of frequency bands to form band signals each having each of the frequency bands; means for distributing the band signals to at least two groups; means for encoding the band signals; transmission means for incorporating codes respectively corresponding to the band signals distributed to the groups into one information unit and transmitting the respective resulting information units formed for the corresponding groups with different discard priorities; and reception means for receiving the information units, decoding the band signals in the corresponding information units and synthesizing the resulting decoded band signals.

With this construction, each band signal is divided into at least two groups and information unit is formed for each of the groups. The information units are transmitted with different priorities of discard. Therefore, simultaneous discard of the respective information units does not occur. Even if one information unit is discarded, the original signal is substantially reproduced by decoding the band signals contained in those information units that are not discarded. The components of the band signal contained in the discarded information unit can be interpolated on the basis of the band signals contained in the non-discarded information units.

BRIEF DESCRIPTION OF THE INVENTION

DETAILED DESCRIPTION OF THE INVENTION

Figure 1:
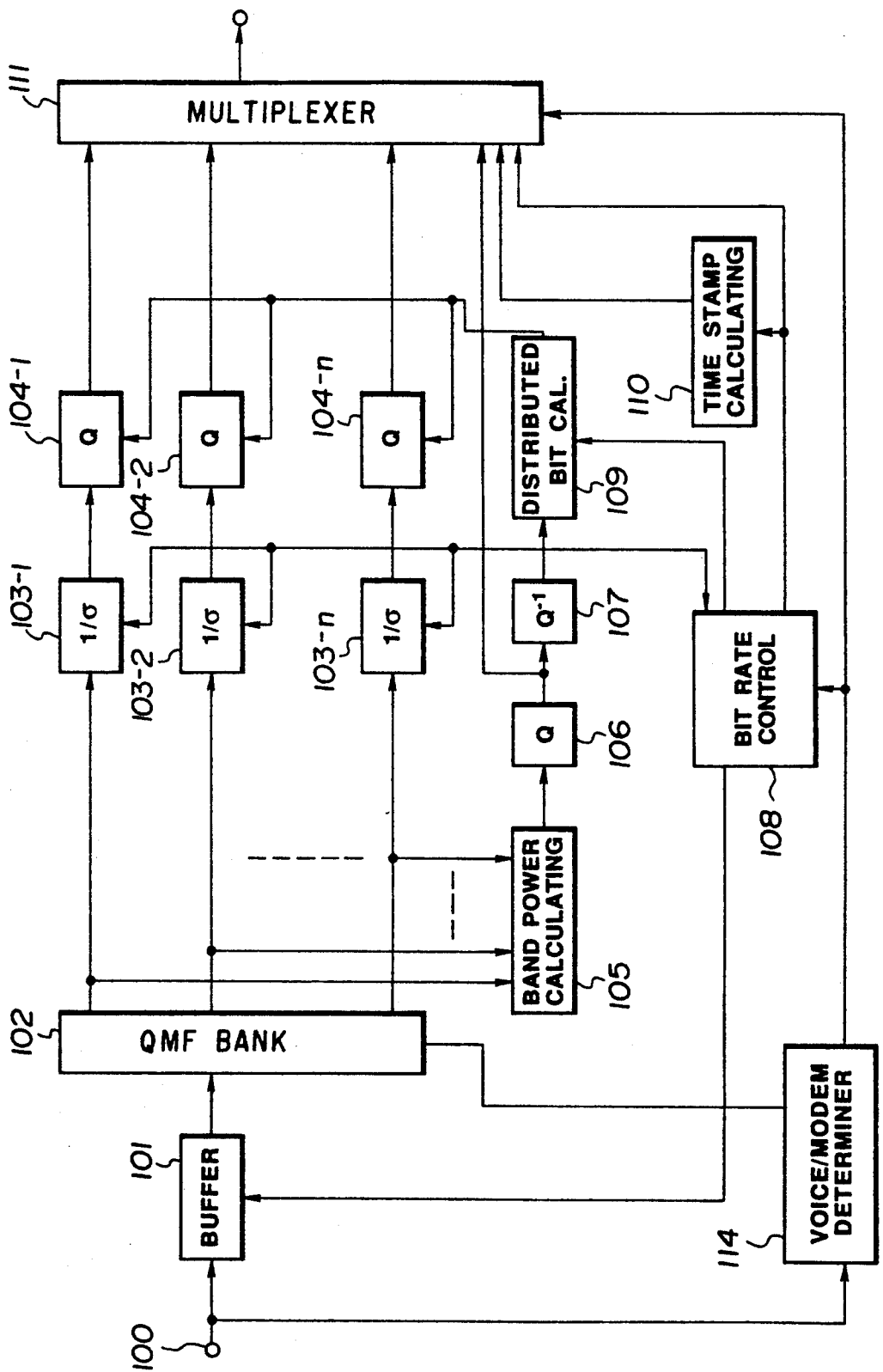
FIG. 1 is a block diagram of an encoder unit in one embodiment of a variable rate encoding and communicating apparatus according to the present invention.

FIG. 1 is a block diagram of an encoder unit of a transmitter in a variable rate encoding and communicating apparatus as one embodiment of the present invention.

In FIG. 1, a digital signal received at an input terminal 100 is stored in an input buffer 101. A voice/modem determiner 114 determines on the basis of a signal from terminal 100 which of a voice signal and a modem signal (output from a terminal modem) the input signal is.

The determination by the modem determiner 114 is made by an identification signal from switching equipment. In more detail, the equipment identifies the attributes (voice, non-limitation, modem signal) of a terminal. The identification signal is delivered from the switching equipment to voice/modem determiner 114 which determines on the basis of the identification signal which of a voice and a modem signal the input signal is.

The series of signals stored sequentially in input buffer 101 is input to a QMF (Quadrature Mirror Filter) bank 102 which divides the input series of signals into a plurality of frequency bands and which has an excellent characteristic which produces no folded distortions of spectrum. In the present embodiment, the QMF bank 102 is used to divide a signal band up to 4 KHz into 8 equally-spaced bands to provide 8 corresponding band signals in 0-500 Hz, 500 Hz-1 KHz, 1-1.5 KHz, 1.5-2 KHz, 2-2.5 KHz, 2.5-3 KHz, 3-3.5 KHz, and 3.5-4 KHz.

Figure 2:
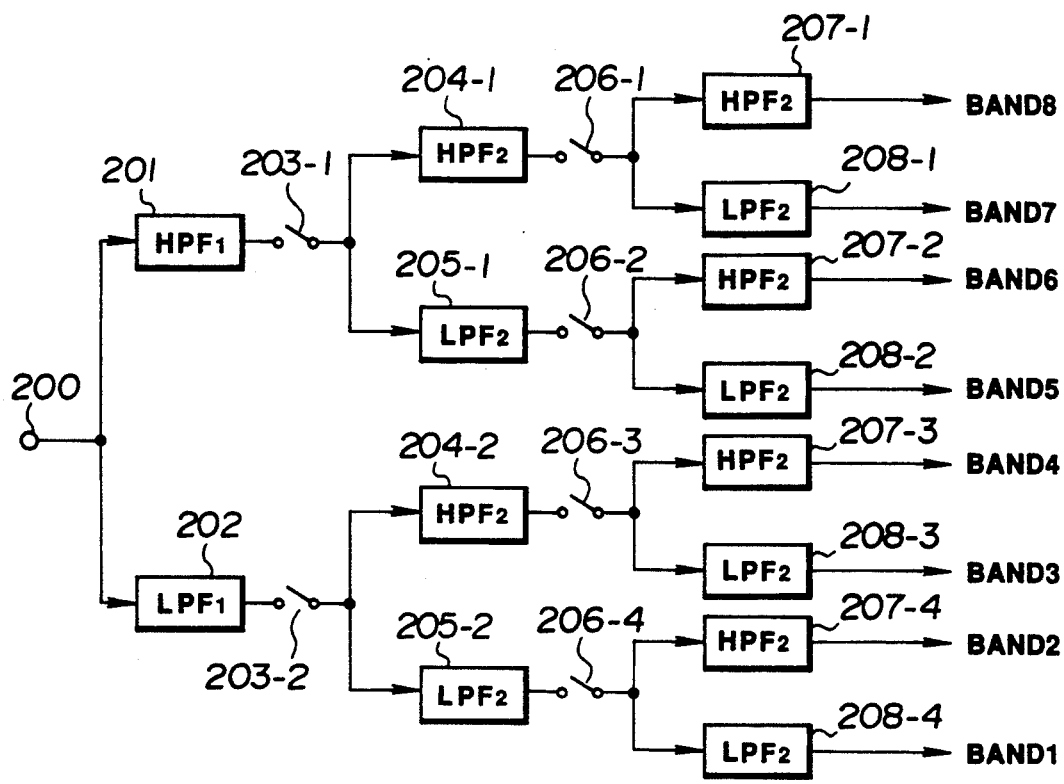
FIG. 2 is a block diagram of an illustrative structure of a QMF bank in the encoder unit of FIG. 1.

FIG. 2 shows one illustrative structure of QMF bank 102 in block diagram. In FIG. 2, QMF bank 102 includes 7 high-pass filters 201, 204-1, 204-2, 207-1, 207-2, 207-3, 207-4; 7 low-pass filters 202, 205-1, 205-2, 208-1, 208-2, 208-3, 208-4; and 6 down samplers 203-1, 203-2, 206-1, 206-2, 206-3 and 206-4. Two kinds of filter blocks having such structure and different in characteristic are provided in QMF bank 102 and which are appropriately used selectively as will be described later in more detail.

In FIG. 1, normalizing circuits 103-1, 103-2, ..., 103-n normalize the corresponding band signals from QMF bank 102 before quantization. A simple specified structure of each of normalizing circuits 103-1, 103-2, ..., 103-n may be constituted by a circuit which divides each band signal by the electric power or RMS (Root Means Square) of that band signal to be described later in more detail. Quantizers 104-1, 104-2, ..., 104-n quantize the respective normalized band signals with predetermined numbers of bits and each include a table lookup. A band power calculating unit 105 calculates the RMS value $\sigma i$ of each band signal by $$\sigma i = \sqrt{\frac{1}{N} \sum_{n=1}^{N} \times i^2(n)} \quad (1)$$

where xi(n) is an ith series of band signals where i = 1, 2, ..., 8 and N is the length of an interval of the series of signals for which the RMS value is calcualted.

Quantizer 106 quantizes the respective band RMS values $\sigma i$ output from band power calculating circuit 105 with predetermined numbers of bits and outputs the resulting codes to a multiplexer unit 111 and a dequantizer 107 which outputs the RMS value $\sigma i$ obtained by dequantizing the codes. Normalizing circuits 103-1, 103-2, ... 103-n, bit rate control unit 108 and distributed bit calculating unit 109 each use the RMS $\sigma i$ obtained by dequantization as the corresponding band RMS value. Thus, a deterioration in the characteristic caused by a mismatch of the encoder in the transmission end and the decoder in the reception end different in the number of quantizing bits and normalizing parameter is completely prevented.

Bit rate control unit 108 controls the bit rate such that the qualities of band signals decoded by decoders on the basis of the power values of the respective band signals when the voice signal is encoded are constant and a quantity of codes output from the encoder is constant. Bit rate control unit 108 sets the bit rate such that when a modem signal is encoded, the quality of the signal encoded satisfies a desired standard of quality.

Distributed bit calculating unit 109 calculates the respective bit values Rk distributed to quantizers 104-1, 104-2, ..., 104-n for the corresponding bands on the basis of the power values of the respective band signals and the bit rates output from bit rate control unit 108.

Time stamp calculating circuit 110 calculates a time stamp Ts(i) for a cell which is an information unit having a fixed length to transmit the obtained codes. More specifically, since the length of a series of signals transmitted by a single cell (represented by the number of sample units) is output from bit rate control unit 108, the number of sample units is calculated by addition each time a cell is sent. Ts(i) is calculated by $$Ts(i) = Ts(i-1) + Ns(i-1) \quad (2)$$

where Ts(i) is the time stamp for an ith cell and Ts(i−1) is the time stamp for an (i−1)th cell and Ns(i−1) is the number of sample units.

Figure 3A:
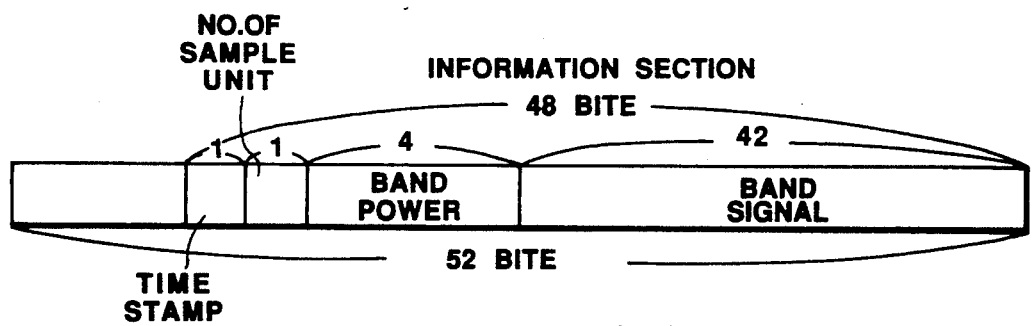
FIGS. 3a and 3b show the format of a cell.

When a voice signal is to be sent, multiplexer unit 111 accommodates in a single cell codes obtained by encoding each band signal, codes indicative of the RMS value of that band signal, the number of sample units in one cell, and a time stamp in a format of FIG. 3(a) in which the overall cell length is 52 bytes and the length of the information section is 48 bytes. The details of the information section include one byte for the time stamp, one byte for the number of sample units, 4 bytes for the RMS value of each band signal and 42 bytes for the codes of each band signal.

Figure 3B:
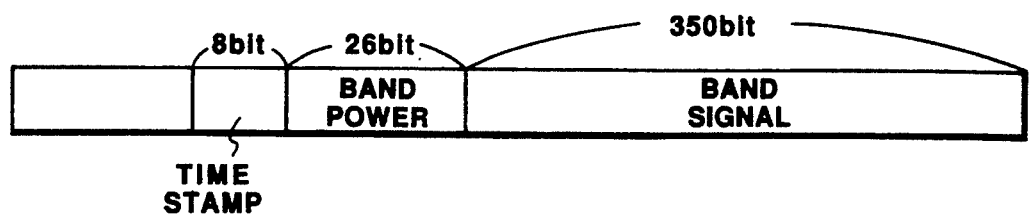

When a modem signal is to be sent, it is accommodated in a single cell in the format of FIG. 3(b) in which the details of an information section are 8 bits for the time stamp, 26 bits for the RMS value of each band signal and 350 bits for the codes of each band signal.

The details of 26 bits for the RMS value of each band signal are 3 bits for each of the bands 0–500 Hz, 3–3.5 KHz and 4 bits for each of 500 Hz–1 KHz, 1–1.5 KHz, 1.5–2 KHz, 2–2.5 KHz, and 2.5–3 KHz and 0 bits for the band of 3.5–4 KHz. This is because the number of bits is reduced in the modem signal since there are no signals in the 3.5–4 KHz band and the signal power is low in the bands of 0–500 Hz and 3–3.5 KHz.

When the codes of a modem signal are to be transmitted, it is transmitted in a cell having a low discard priority or difficult to discard during transmission. The data indicative of such discard priority is delivered from voice/modem determiner 114 to multiplexer unit 111 where the data is inserted into a place outside the information section. When a voice signal is to be transmitted, the discard priority of a cell is not set especially in the present embodiment.

The above concerns the description of the functions of the respective elements in FIG. 1. The operation of the apparatus will be described hereinafter.

Figure 4:
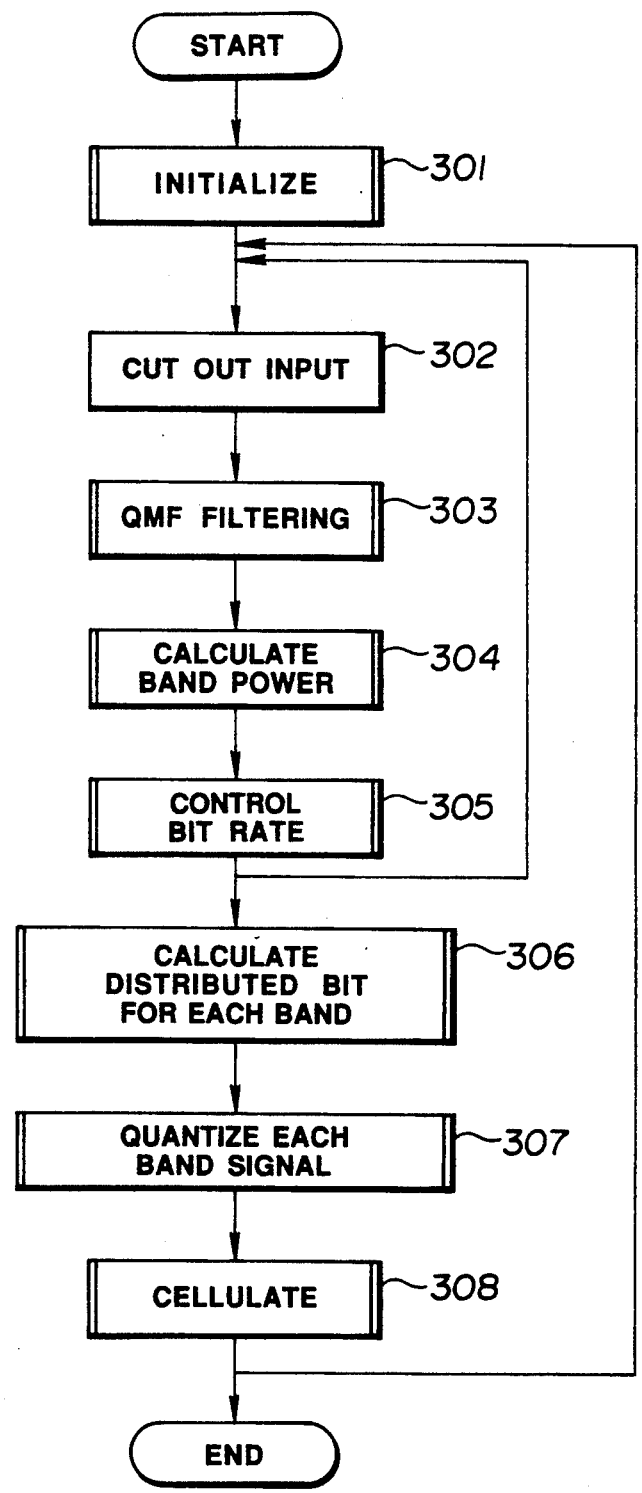
FIG. 4 is a flowchart illustrating the operation of the encoder unit of FIG. 1 performed when a voice signal is transmitted.

FIG. 4 is a flowchart indicative of the entire operation of the encoder performed when the input signal is determined as a voice signal by voice/modem determiner 114.

First, input buffer 101 and time stamp calculating unit 110 are cleared for initialization. QMF bank 102 is set in a filter block for a voice signal and a target SNR, the maximum number of sample units and the length of a sample unit for the voice signal are set (step 301). The series of input signals in input buffer 101 is cut out in sample units (step 302), the cut-out series of signals is divided into respective band signals by QMF bank 102 (step 303), the RMS value $\sigma.i$ of each band signal is calculated by band power calculating unit 105 (step 304), and a bit rate is set by bit rate control unit 108 (step 305). These steps 302–305 are repeatedly performed to obtain an appropriate bit rate with which a voice signal is to be encoded. The bit rate is one which achieves the target SNR. The bit value Rk distributed to each band is calculated by distributed bit calculating unit 109 (step 306), each band signal is quantized by the quantizer on the basis of the distributed bit value Rk of each band (step 307), and a cell is formed (cellulated) by multiplexer unit 111 (step 308). Such a sequence of processing operations is repeated for each cell at which time the multiplexer unit 111 accommodates in a cell all the respective codes from the corresponding quantizers 104-1 to 104-n, the respective RMS values $\sigma.i$ of the bands from quantizer 106, the number of sample units from bit rate control unit 108 and a time stamp from time stamp calculating unit 110 in the format shown in FIG. 3(a) and then sends the resulting cell.

Figure 5:
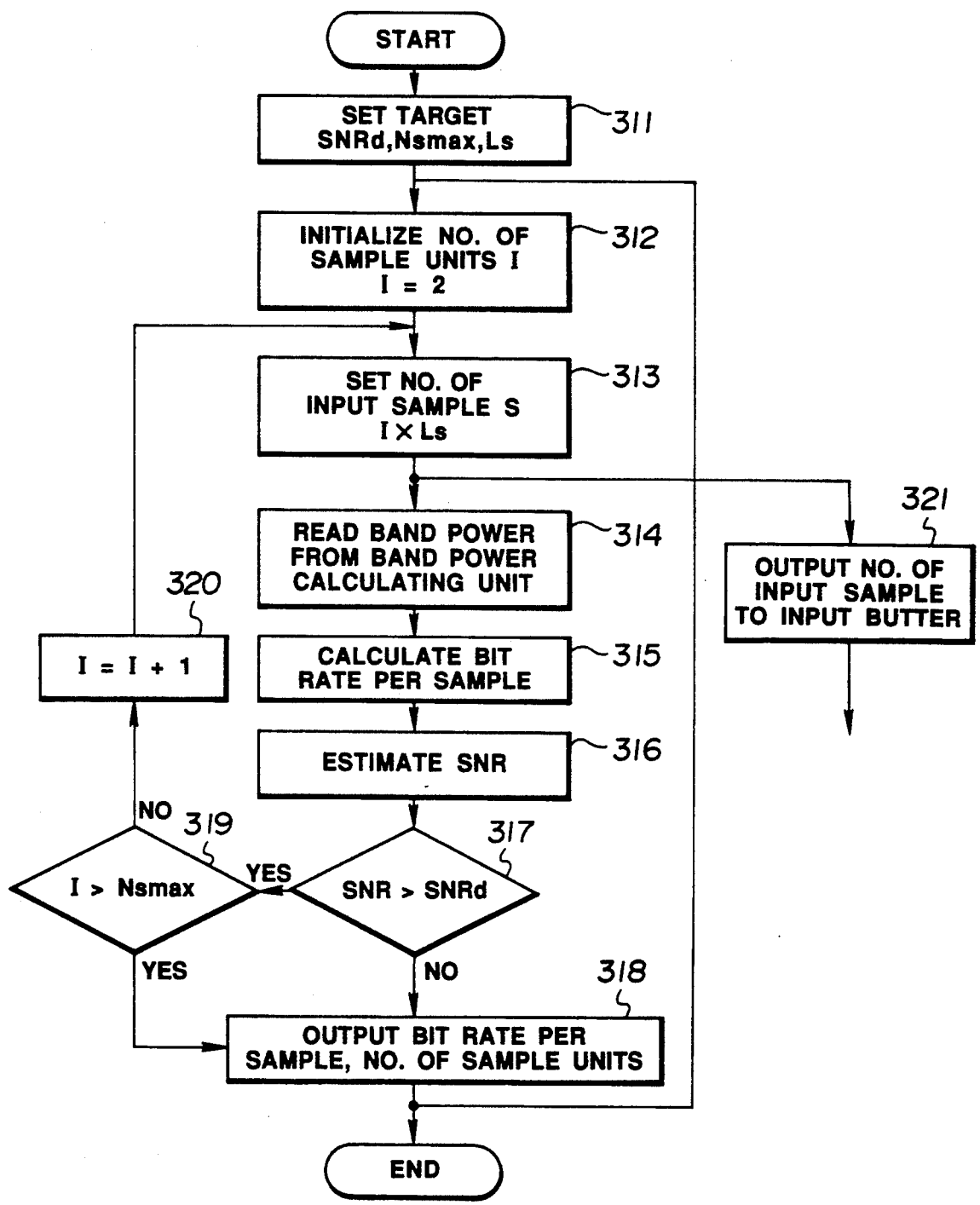
FIG. 5 is a flowchart illustrating the operation of a bit rate control unit in the encoder unit of FIG. 1.

Control by bit rate control unit 108 at step 305 of FIG. 4 is provided in accordance with the flowchart of FIG. 5.

First, a target SNR (SNRd) corresponding to a voice signal, the maximum number of sample units Nsmax which can be cut out when one cell is sent and the unit length Ls of a sample are set initially (step 311). Next, I=2 is set as the initial value of the number of sample units to be cut out I (step 312), the number of samples input to QMF bank 102 is set to I×Ls where Ls is the number of samples per one sample unit (step 313) and this value is reported to input buffer 101 (step 321). In response to this reporting, input buffer 101 cuts out a series of input signals corresponding to the number of samples I×Ls and sends it to QMF bank 102.

The respective RMS values σi calculated by band power calculating unit 105 are read (step 314), and a bit rate or the average number of bits per sample R required for encoding a series of signals having the number of samples I×Ls to be encoded to be accommodate in a single cell is calculated by $$R = \frac{B}{I \times Ls} \quad (3)$$

where B is the total number of bits allocated to transmit the codes of the band signal. In the format of FIG. 3(a) applied to a voice signal, B=42 (bytes)×8 (bits)=336 (bits) (step 315).

When a voice signal encoded at bit rate R is decoded by the decoder in the reception end using the RMS value σi and bit rate R of each band, the SNR is estimated by $$SNR = 10\log_{10}\left[\frac{\sum_{k=1}^{Mb} \sigma k^2}{Mb \cdot \epsilon^2 \cdot 2^{-2R} \cdot \left(\prod_{k=1}^{Mb} \sigma k^2\right)^{1/Mb}}\right] \quad (4)$$

where Mb is the number which divides that band and Mb=8 in the particular embodiment (step 316).

The estimation equation of the SNR is based on the result of theoretical analysis of the average of the squares of the decoded errors occurring when optimal bits are distributed in a subband encoding system. Table 1 compares the values estimated by equation (4) and the SNR values obtained by computer simulation.

TABLE 1

| CELL No. | ESTIMATED SNR | SNR OBTAINED BY SIMULATION |
| --- | --- | --- |
| 1 | 23.4 | 24.1 |
| 2 | 12.6 | 12.8 |
| 3 | 21.8 | 21.2 |
| 4 | 28.7 | 29.7 |
| 5 | 26.1 | 26.0 |
| 6 | 17.1 | 16.2 |
| 7 | 24.4 | 23.4 |
| 8 | 23.9 | 24.7 |
| 9 | 17.5 | 16.2 | values coincide well with the SNR values obtained by encoding the corresponding voice signals actually. It is to be noted that Table 1 is obtained when 64-Kbps voice data is compressed to 16 Kbps data, which is then encoded.

After the SNR is estimated, the SNR and the target SNRd are compared (step 317). If the SNR is larger than the SNRd, it is checked whether the number of sample units I is more than the maximum number of sample units Nsmax (step 319). If not, the number of sample units is incremented (step 320) and control returns to step 313. Similar operations are repeated until the SNR becomes SNRd or less. The bit rate per sample obtained directly before the SNR becomes less than SNRd is output to distributed bit calculating unit 109 and the number of sample units (I−1) is output to time stamp calculating unit 110 and multiplexer unit 111 (step 318). If the number of sample units exceeds Nsmax at step 319, the bit rate per sample and the number of sample units I=Nsmax are output (step 318).

The bit rate control method described so far estimates the SNR while increasing the number of samples of the voice signal to be encoded to thereby change the bit rate and has the following advantages:

(1) The communication quality is invariably maintained constant.

(2) The encoded data can accurately incorporated into a cell having a fixed length.

(3) Since the bit rate is changed depending on a change with time in the voice signal, the encoding efficiency is high.

Figure 6:
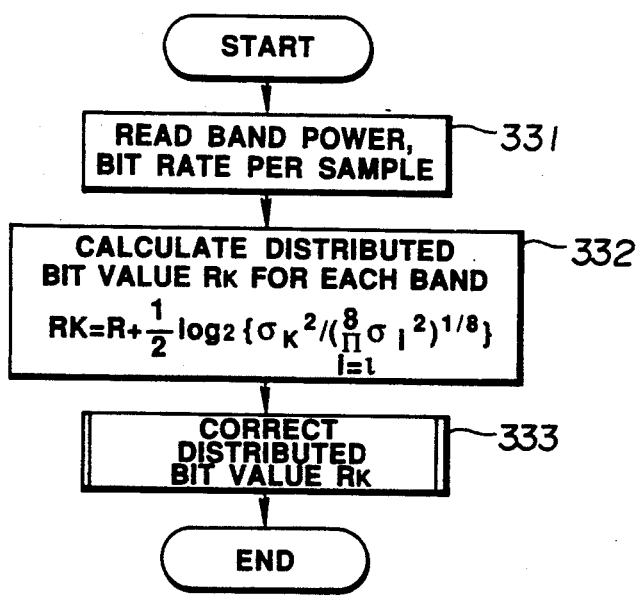
FIG. 6 is a flowchart illustrating the operation of a distributed bit calculating unit in the encoder unit of FIG. 1.

The operation of distributed bit calculation unit 109 at step 306 of FIG. 4 is performed in accordance with the flowchart of FIG. 6.

At first, the RMS values σi of the corresponding bands are read from dequantizer 107, the bit rate R per sample is read from bit rate control unit 108 (step 331) and the distributed bit values Rk of the corresponding bands are calculated in accordance with the following equation:

$$Rk = R + \frac{1}{2}\log_2\left[\frac{\sigma k}{\left(\prod_{k=1}^{Mb} \sigma k^2\right)^{1/Mb}}\right] \quad (5)$$

where k=1, 2..., Mb which is 8 (the number of bands).

The above equation illustrates the optimal distributed bit values which minimize the average of the squares of the decoded errors, which is described in N. S. Jayant and P. Noll: "Digital Coding of Waveforms", PRENTICE-HALL, NJ (Reference 4).

Distributed bit value Rk calculated by equation (5) is a real value. If a scalar quantizer is used to quantize a signal in each band, it is necessary to convert Rk to an integer value, so that Rk is corrected (step 333).

Figure 7:
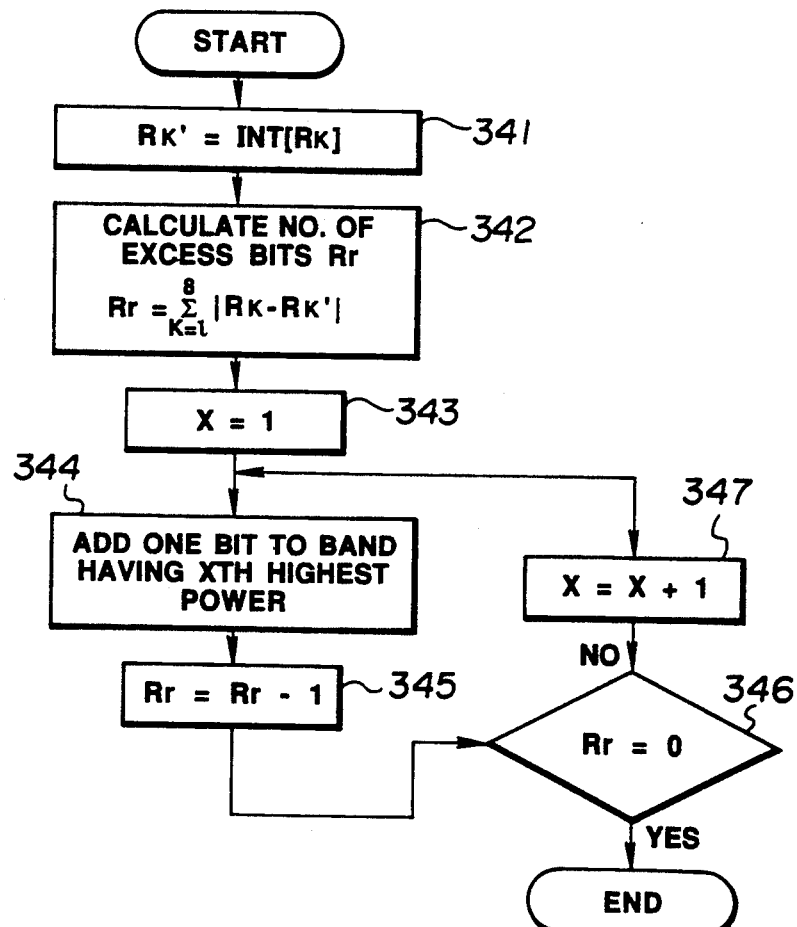
FIG. 7 is a flowchart illustrating a process for correcting bit distribution.

FIG. 7 is a flowchart indicative of one example of a process for correcting the distributed bit value Rk. First, an integer Rk' is obtained by cutting away a fraction of Rk (step 341) and the number of rest bits Rr produced thereby is calculated in step 342 by $$Rr = \sum_{k=1}^{Mb} |Rk - Rk'| \quad (6)$$

An index X=1 is then set (step 343). One bit of the number of rest bits Rr is allocated to the distributed bit value Rk of a band where the RMS value σi is largest in accordance with the value "1" of index X (step 344)

and one bit is substracted from the number of rest bits Rr (step 345). Unless the number of rest bits Rr becomes 0 by such subtraction (step 346), one is added to index X to provide X=2 (step 347) and the processing at step 344 and subsequent steps are repeated on the distributed bit value Rk of a band having a second largest RMS value σi in accordance with the value "2" of index X. When the number of rest bits Rs becomes 0 in this processing (step 346), the processing ends. Namely, the rest bits the number of which is Rr are redistributed one by one in order of band having high electric power, which serves to reduce the decoded errors.

Figure 8:
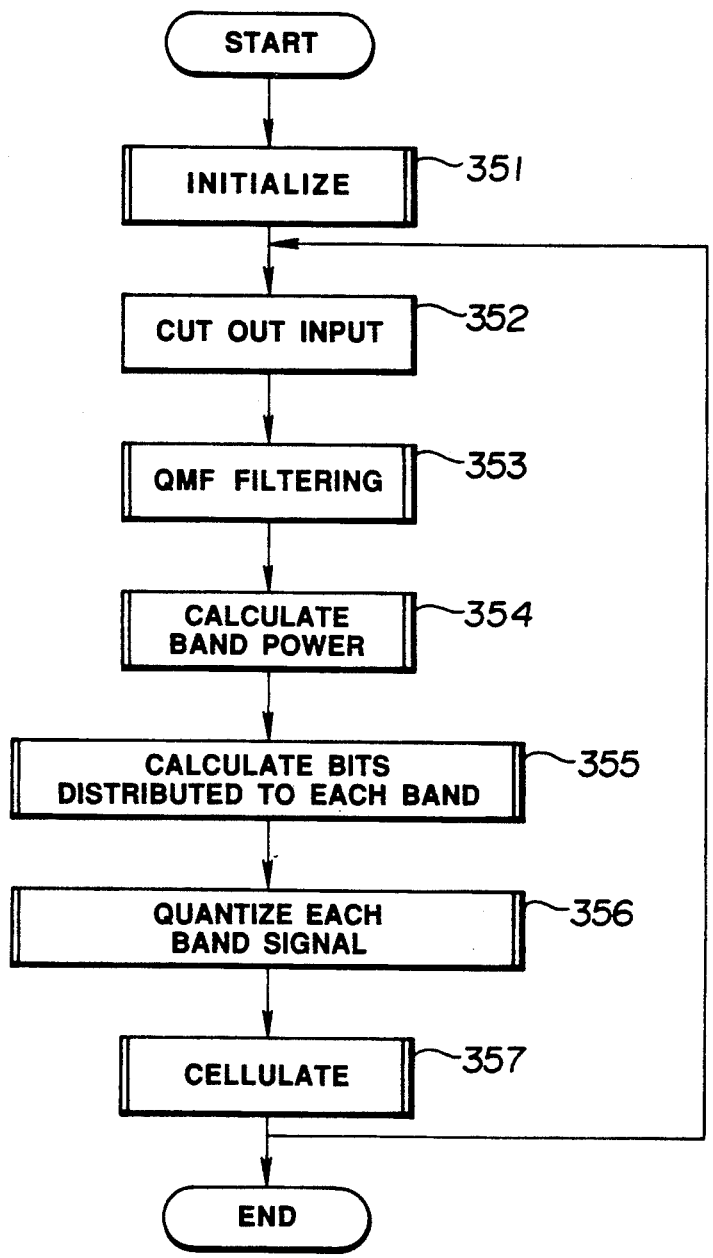
FIG. 8 is a flowchart illustrating the operation of the encoder unit of FIG. 1 performed when a modem signal is transmitted.

The entire operation of the encoder performed when the input signal is determined as a modem signal by voice/modem determiner 114 will be described with reference to a flowchart of FIG. 8.

First, initializing purposes, input buffer 101 and time stamp calculating circuit 110 are cleared. QMF bank 102 is set in a high-degree filter block for the model signal, a bit rate R is set for encoding the modem signal, the number of samples M of the modem signal transmitted in a single cell is set (351).

The bit rate R is obtained experimentally such that the error rate due to the encoding of the modem signal is $10^{-6}$ or less, and the value R is used as a setting point.

The number of samples M of a model signal transmitted in a single cell is given by $$M = \text{int}\left[ \frac{350}{\text{int}(R \times 8)} \times 8 \right] \quad (7)$$

where R is the set bit rate.

The series of input signals in input buffer 101 is cut out in units of the number of samples M per cell (step 352), each cut-out series of signals is divided by QMF bank 102 into the corresponding band signals (step 353), the respective RMS values σi of the band signals are calculated by band power calculating unit 105 (step 354), and bits distributed to the respective bands are calculated by distributed bit calculating unit 109 (step 355).

After the bits distributed to the respective bands are calculated, the respective band signals are quantized in accordance with the distributed bits (step 356) and then a cell is formed by cellulating unit 111 (step 357). Such a series of operations is repeated for each cell, at which time the multiplixer unit 111 accommodates in the cell the respective codes from the corresponding quantizers 104-1 to 104-n, the respective RMS values σi of the corresponding bands from quantizer 106 and the time stamp from time stamp calculating circuit 110 in the format of FIG. 3(b) and then sends that cell. Since the number of samples per cell is determined in the time stamp, the time stamp adding-up circuit 110 adds up a predetermined value Ns (which is set to 1 in the present embodiment) each time a cell is sent out to thereby obtain a time stamp. As mentioned above, data having a low discard priority is inserted into a cell of the modem signal.

Since the bit rate R is experimentally determined beforehand in the case of the modem signal, and hence the number of samples M is naturally determined, bit rate control unit 108 is not required to perform an operation to determine the number of samples shown in the flowchart of FIG. 5. As mentioned above, since there are no signals in the band of 3.5–4 KHz in the modem signal, the distributed bit calculating unit 109 calculates the distributed bit values Rk of 7 bands except for the 3.5–4 KHz bands in accordance with equation (5), converts the respective distributed bit values Rk to the corresponding integers on the basis of equation (6), and distributes the resulting numbers of rest bits to the respective bands to thereby obtain the distributed bits for the respective bands. The above concerns the description of the encoder unit.

Figure 9:
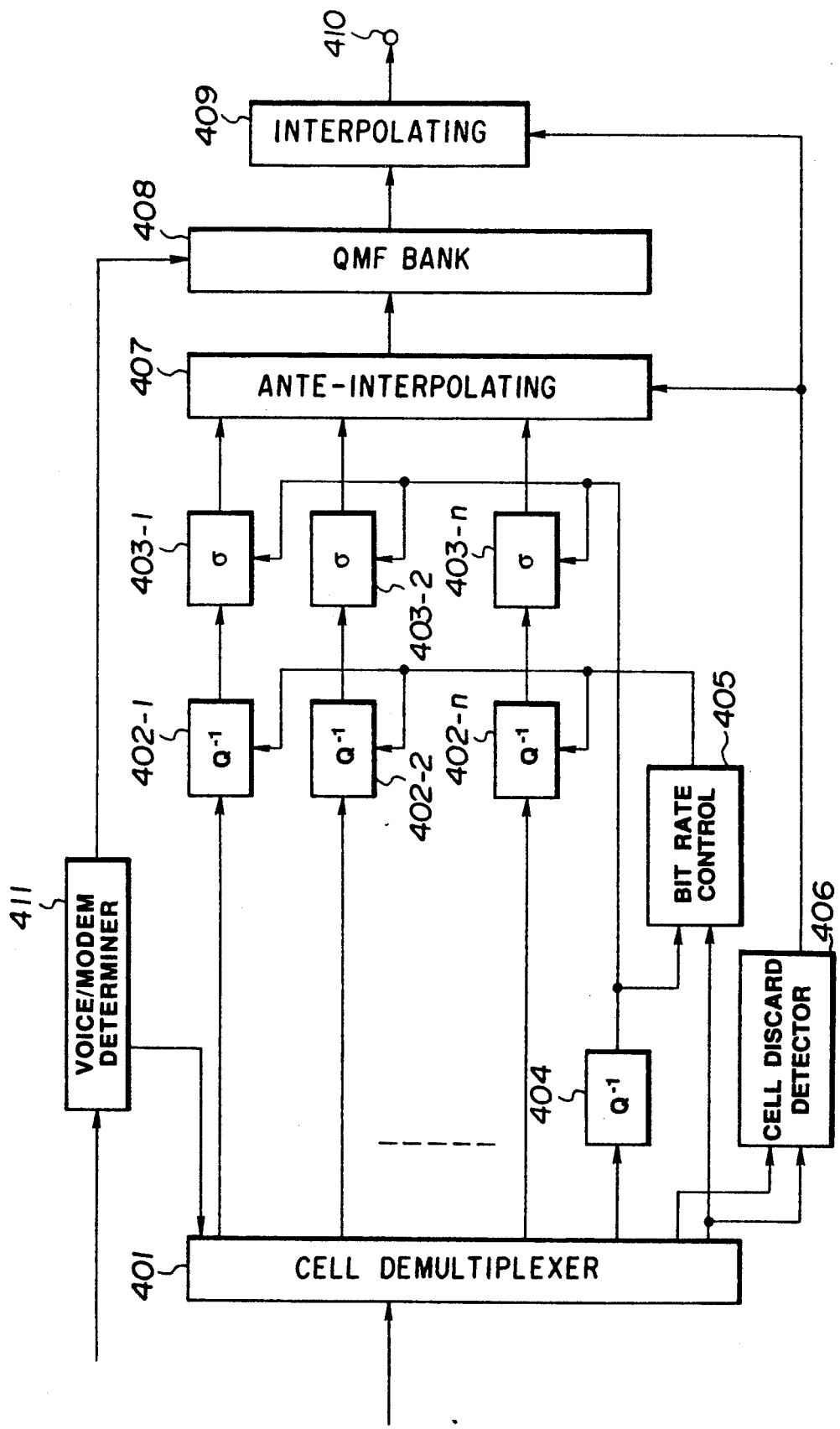
FIG. 9 is a block diagram of a decoder unit in the embodiment.

FIG. 9 is a block diagram of a decoder of a receiver in the variable rate encoding and communicating apparatus as the embodiment of the present invention.

In FIG. 9, voice/model determiner 411 determines which of the codes of a voice signal and those of a modem signal are entered into a cell from the transmitter. In this case, an identification signal indicative of the attibutes of a terminal is delivered from the switching equipment to voice/modem determiner 411 before communication starts. The determiner 411 determines on the basis of the identification signal whether the input signal is a voice or a modem signal.

Since voice/modem determiner 411 clarifies which of the formats of FIGS. 3(a) and (b) the cell has, cell demultiplexer unit 401 decomposes the cell into time stamp Ts, the number of sample units Ns, the respective RMS values σ.k of the corresponding bands and the respective codes of the corresponding band signals in accordance with the result of the determination. After the decomposition of the cell, the respective RMS values σ.k of the corresponding bands are sent to dequantizer 404 while time stamp Ts, and the number of sample units Ns are sent to the appropriate elements. Dequantizer 404 obtains the respective RMS values σ.k of the corresponding bands by dequantization.

When the input signal is determined as a voice signal by voice/modem determiner 411, distributed bit calculating unit 405 calculates the respective distributed bit values Rk of the corresponding bands, using the RMS values (σk is 1, 2, . . . , Mb) of the corresponding bands from dequantizer 404 and the number of sample units Ns from cell demultiplexer unit 401 as in distributed bit calculating unit 109 of FIG. 1. In more detail, distributed bit calculating unit 405 calculates a bit rate R per sample in accordance with equation (3), distributed bit values Rk (where k=1, 2, . . . , Mb) of the corresponding bands in accordance with equation (5), converts distributed bit values Rk of the corresponding bands to the corresponding integers, and distributes the number of rest bits Rr in a predetermined sequence.

If voice/modem determiner 411 determines that the input signal is a modem signal, the respective distributed bit values Rk of the bands may be calculated like a voice signal on the basis of the bit rate because the bit rate R is determined beforehand.

The distributed bit values Rk, thus obtained, of the corresponding bands are reported to cell demultiplexer unit 401 which decomposes the respective codes of the bands in a cell into ones for the respective bands on the basis of the corresponding distributed bit values Rk of the bands and which distributes the decomposed codes to the corresponding dequantizers 402-1, 402-2, . . . 402-n. These dequantizers receive the respective distributed bit values Rk of the bands from distributed bit calculating unit 405, and dequantize the respective codes of the bands on the basis of the corresponding distributed bit values Rk. The respective signals of the bands obtained by this dequantization are input to the corresponding denormalizing circuits 403-1, 403-2, . . . , 403-n, which multiply together the respective band signals from the corresponding dequantizers and the respective band RMS values σk from the dequantizer 404 to form the corresponding band signals.

QMF bank 408 includes two kinds of filter blocks for voice and modem signals and selects one of the two filter blocks in accordance with the result of determination by voice/modem determiner 411. These two kinds of filter blocks have the same structure as the corresponding filter locks in the QMF bank in the transmission end shown in FIG. 2 except that the inputs and outputs of the former filter blocks are the outputs and inputs, respectively, of the corresponding latter filter blocks.

Cell discard detector 406 detects whether a cell is discarded or not, using the number of sample units Ns and time stamp Ts received.

Figure 10:
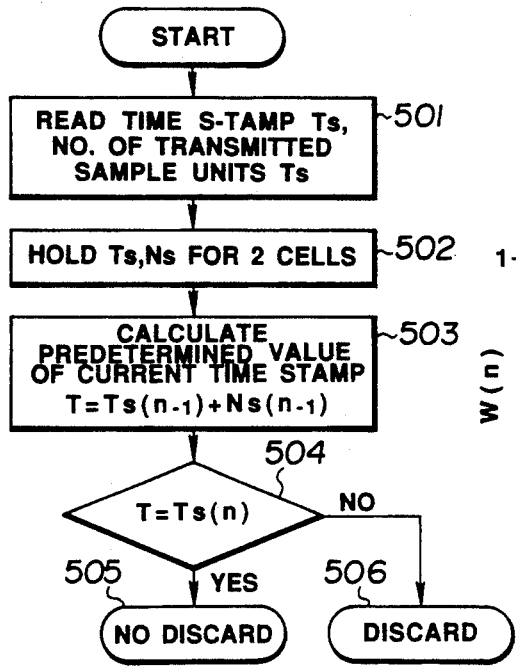
FIG. 10 is a flowchart indicative of the operation of a cell discard detector in the decoder unit of FIG. 9.
Figure 11:
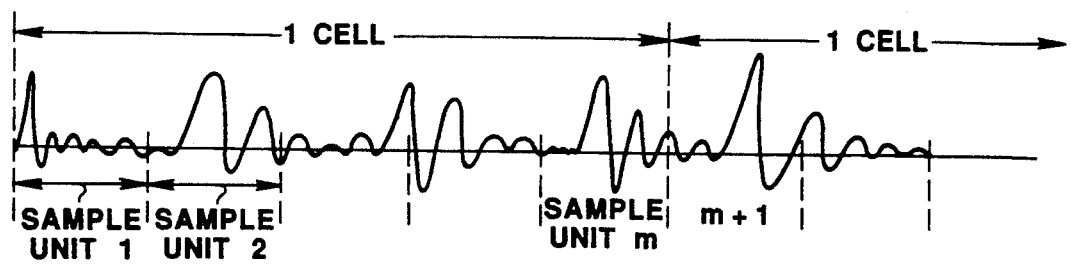
FIG. 11 shows a waveform used for illustrating a cell discard detection process.

FIG. 10 is a flowchart indicative of detection by cell discard detector 406. This detection will be described with reference to FIG. 10 in conjunction with FIG. 11. First, each time a cell is received, detector 406 reads time stamp Ts and the number of sample units Ns from cell decomposing unit 401 (step 501) and stores these data for two cells at all times (step 502). Next, the detector 406 calculates a predetermined value T of the current time stamp, using time stamp Ts (n−1) and the number of sample units Ns (n−1) of the cell preceding by one time the cell received at present (time n) (step 503) as follows:

$$T = Ts(n-1) + Ns(n-1)$$

Detector 406 compares the predetermined value T and current time stamp Ts(n) (step 504). If they coincide, it determines that there was no discard (step 505). If not, it determines that there was a discard directly before the current cell (step 506). For example, in FIG. 11, $$Ts(n-1) = l$$

$$Ns(n-1) = m$$

$$T = Ts(n-1) + Ns(n-1) = m + l = Ts(n) \quad (8)$$

Therefore, it determines that there was no discard.

When the input signal is a modem signal, the bit rate is constant, so that the value Ns is handled as being constant and is added up to set time stamp Ts. In this case, the determination in accordance with equation (8) may similarly be made. While the time stamp is indicated with 8 bits contained in the cell, it may have a value exceeding 8 bits in which case the less significant ones of 8 bits are taken away and the value Ns is subsequently added up.

In FIG. 9, if the detector 406 determines that there was no discard, the respective band signals from the corresponding denormalizing circuits bypass ante-interpolation unit 407 to arrive at QMF bank 408. If the detector determines that there was a discard, the respective "0's" from ante-interpolation unit 407 are input to QMF bank 408 instead of the respective band signals.

When QMF bank 408 receives the respective band signals, it synthesizes these signals to form an entire band signal and outputs it as a decoded signal. At this time, QMF bank 408 sets one of the two kinds of filter blocks for the voice and modem signals in accordance with the result of the determination by voice/modem determiner 411.

Interpolation unit 409 interpolates the signal lost due to the discard of a cell when it is informed of the result of the determination by cell discard detector 406 that there was a discarded cell.

Figure 12:
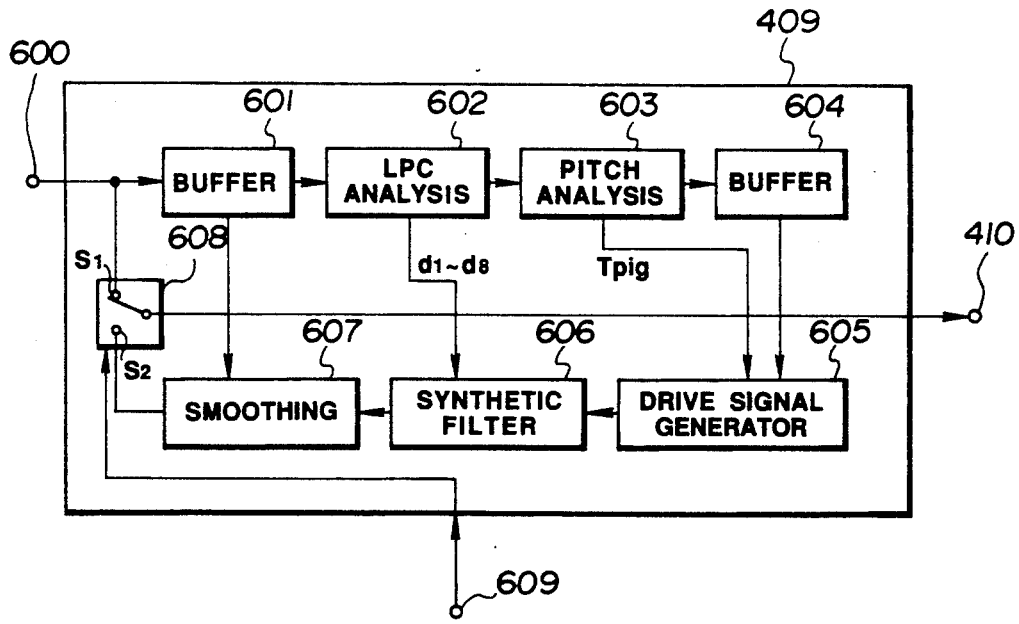
FIG. 12 is a block diagram of an illustrative structure of an interpolating unit in the decoder unit of FIG. 9.

FIG. 12 is a block diagram of one example of interpolation unit 409. FIGS. 13(a)-(e) show an example of a signal waveform indicative of interpolation. In FIG. 12, decoded signals (FIG. 13(a)) received at input terminal 600 are stored sequentially in buffer 601. A cell discard signal indicative of the result of the determination from cell discard detector 406 is received at terminal 609 and then applied to switch 608 to thereby cause switch 608 to be changed to a designated position. If the result of the determination is that there was no cell discard, switch 608 is switched over to terminal S1 such that a decoded signal from input terminal 600 is bypassed to output terminal 410. If the result of the determination is that there was a discarded cell, switch 608 is switched over to terminal S2 and interpolation is made as will be described hereinafter.

First, a decoded signal obtained from the cell immediately preceding the discarded cell is read out from buffer 601 and input to LPC analysis unit 602 which makes an LPC analysis using autocorrelation or covariance to thereby calculate prediction coefficients α1, α2, ..., αp (where p is a prediction coefficient, which is 8 in the present embodiment) and a prediction residue signal e(n). LPC analysis is described in Rabiner, L. R. and Shater, R. W. "Digital Processing of Speech Signals", 1978 Prentice Hall (Reference 5) and further description thereof will be omitted. The transfer function H(z) of the prediction filter is given by $$H(z) = 1 - \sum_{i=1}^{p} \alpha_i z^{-i} \quad (9)$$

Pitch analysis unit 603 analyzes the pitch of a prediction residue signal e(n) to thereby calculate pitch period Tp, gain g and prediction residue signal ep(n). While the pitch analysis is also described in Reference 5, the pitch period Tp and gain g are calculated as follows in the present embodiment.

By letting the last sample point be n=N in a decoded signal obtained from a cell directly before the discarded cell, the following error function E(Tp) is defined as:

$$E(Tp) = \sum_{n=N-L}^{N} |x(n) - x(n - Tp)| \quad (10)$$

where 20≦Tp≦140, and L is the length of a section through which an error is estimated and selected to be 70 in the present embodiment.

The pitch period Tp is calculated as one which minimizes E (Tp) of the above equation. Pitch gain g is then calculated in accordance with the following equation:

$$g = \frac{\sum_{n=N-Tp}^{N} x(n) \times (n - Tp)}{\sum_{n=N-Tp}^{N} \{x(n - Tp)\}^2} \quad (11)$$

Prediction residue signals e(n), ep(n) are calculated in accordance with equation (12) and stored in buffer 604:

$$e(n) = x(n) - \sum_{i=1}^{p} ai \times (n - i) \quad (12)$$

$$ep(n) = e(n) - g \cdot e(n - Tp) \quad (13)$$

where x(n) is the signal output from buffer 601.

Figure 13:
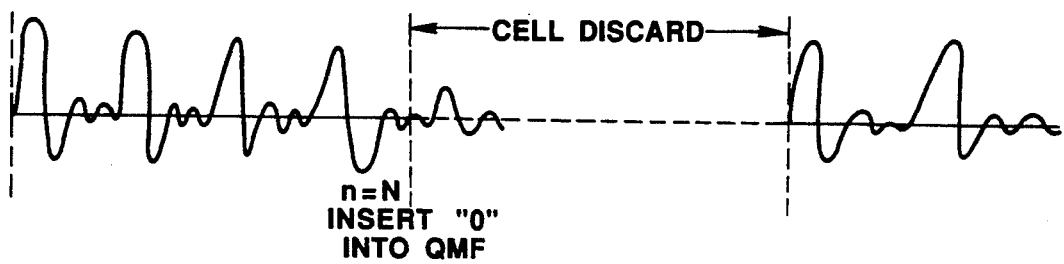
FIGS. 13a-13e show waveforms used for illustrating the operation of an interpolating unit of FIG. 12.
Figure 13:
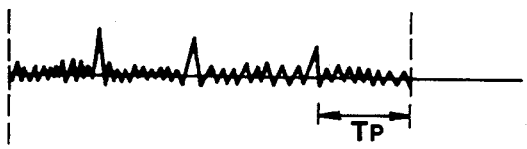
Figure 13:
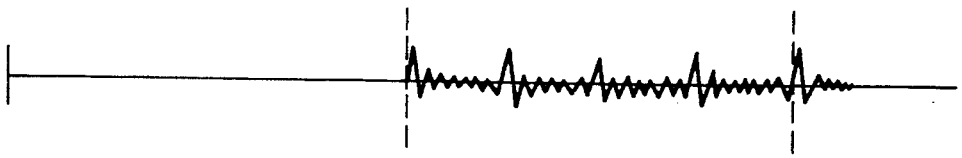
Figure 13:
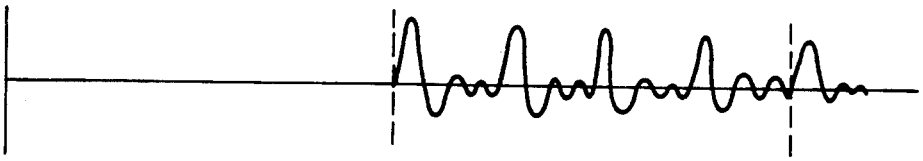
Figure 13:
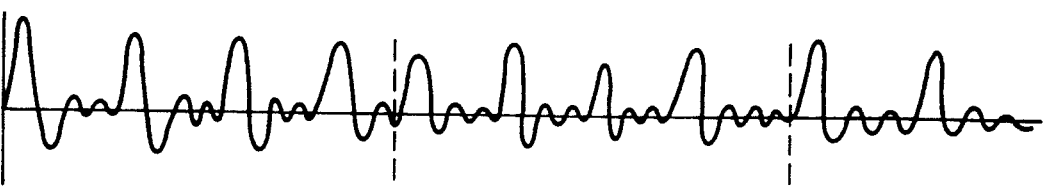

Drive signal generator 605 reads from buffer 604 the last Tp sample portion of prediction residue signal ep(n) (FIG. 13(b)) of the directly preceding cell, and signals each including the product of the residue signal and pitch gain g are obtained by equation (13), and are repeatedly combined to thereby produce a drive signal shown in FIG. 13(c).

The drive signal is input to a synthetic filter 606 which includes an inverse filter of the prediction filter of equation (9) to thereby synthesize a signal which was to be obtained from the discarded cell (FIG. 13(d)). The synthetic signal is smoothed by smoothing unit 607 such that it smoothly continues to the decoded signal on the cell directly before the discard signal or to the decoded signals before and after the discarded signal (FIG. 13(e)). Thereafter, a reproduced interpolated signal is sent through switch 608 out of output terminal 410.

Figure 14:
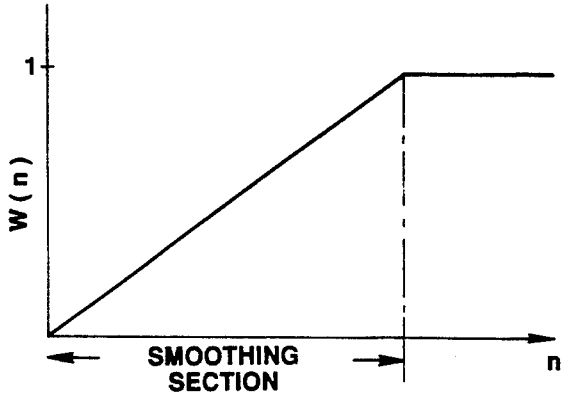
FIG. 14 is a graph of a smoothing window function.

Smoothing is made in accordance with the following equation:

$$y(n) = \{1 - W(n)\} \times (n) + W(n) \times (n) \quad (14)$$

where x is the decoded signal on the cell directly before the discard, x(n), . . . is the synthetic signal, and y(n) is the smoothed output, W(n) is the window function for the smoothing operation and the graph of FIG. 14 is typical of the window function.

Such interpolation is for the drive signal. This process produces the effect that even if the drive signal has discontinuous points with the waveform of a cell before or after the drive signal, the discontinuous points are smoothed by causing the drive signal to pass through the synthetic filter and are virtually not noticed as such in the voice signal. Since the smoothing circuit improves the continuity of that particular cell with those before and after that particular cell, and hence a deterioration in the decoded signal due to cell discard is virtually not noticed.

It was confirmed that the above-described embodiment has the excellent nature that the embodiment provides an average bit rate of 21 kbps, achieves a communication quality not less than ADPCM (32 kbps) and brings about virtually no deteriorated quality at a cell discard rate of 5% as the result of simulation by computer under the conditions where the number of bands is 8, the length of a sample unit is 24 samples, the maximum number of sample units is 12, and the target SNR is 22 dB.

According to this embodiment, the encoding bit rate is controlled in sample units, so that the quality of the decoded signal is advantageously maintained constant. In addition, the encoding bit rate is changed in accordance with the entropy (quantity of an information) of the input signal, so that high encoding efficiency is achieved advantageously. In addition, since the number of bits is distributed to the respective bands on the basis of the respective power values of the band signals, the SNR of the decoded signal is improved to thereby advantageously obtain an improved decoded quality. Since the total sum of the codes of the respective band signals is controlled such that it is accommodated in a cell having a fixed length, a reduction in the efficiency due to the excess and failure of the length of codes is prevented.

According to the above embodiment, the respective band signals are encoded independently in sample units, so that the embodiment produces the advantage that any deterioration in the communication quality due to cell discard does not continue while it does in the ADPCM and embedded DPCM which control the prediction and quantization using the past signals and that a deterioration in the communication quality is allowed to occur only when the cell is discarded. Since the communication quality is only slightly influenced even if any cell is discarded, it is unnecessary to control a cell preferentially with respect to discard to thereby simplify the system structure.

The interpolation produces the effect that the discarded cell can be reproduced such that no deterioration in the communication quality will be noticeable noticed.

When a modem signal is to be encoded, it is divided into respective band signals using a high degree filter, so that the modem signal can be divided accurately into the respective band signals. Therefore, when the number of bits is distributed to the respective bands on the basis of the corresponding electric power values of the band signals, 0 bits are distributed to a frequency band which is not in the modem signal, so that a desired communication quality is obtained with a reduced number of bits or a reduced bit rate as a whole.

While in the above embodiment an information unit having a fixed length called a cell is illustrated, a voice signal and a modem signal can similarly encoded for an information unit having a variable length called a packet. In the case of the voice signal, it is required that the maximum number of sample units according to which a delay of conversation cannot virtually be noticed is set beforehand each band signal is formed in the maximum number of sample units, a bit rate is calculated at which the SNR of a decoded signal is substantially constant on the basis of the electric power of each band signal, the respective numbers of bits distributed to the corresponding bands are calculated and the respective band signals are encoded. In the case of the modem signal, if a delay of the signal is permitted or the longest packet can be used, it is required that the number of sample units is calculated on the basis of the number of bits accommodatable in that packet and a predetermined bit rate which can hold a predetermined error rate and the modem signal having that number of sample units is encoded as in the above embodiment to communicate with the maximum efficiency while maintaining a desired communication quality.

One embodiment of a variable rate communication apparatus as another aspect of the present invention will be described. In this embodiment, a voice signal is divided into a plurality of band signals, which are then encoded and divided into a low frequency region side group and a high frequency region side group, the respective codes of which are communicated separately in two cells having different discard priorities.

Figure 15:
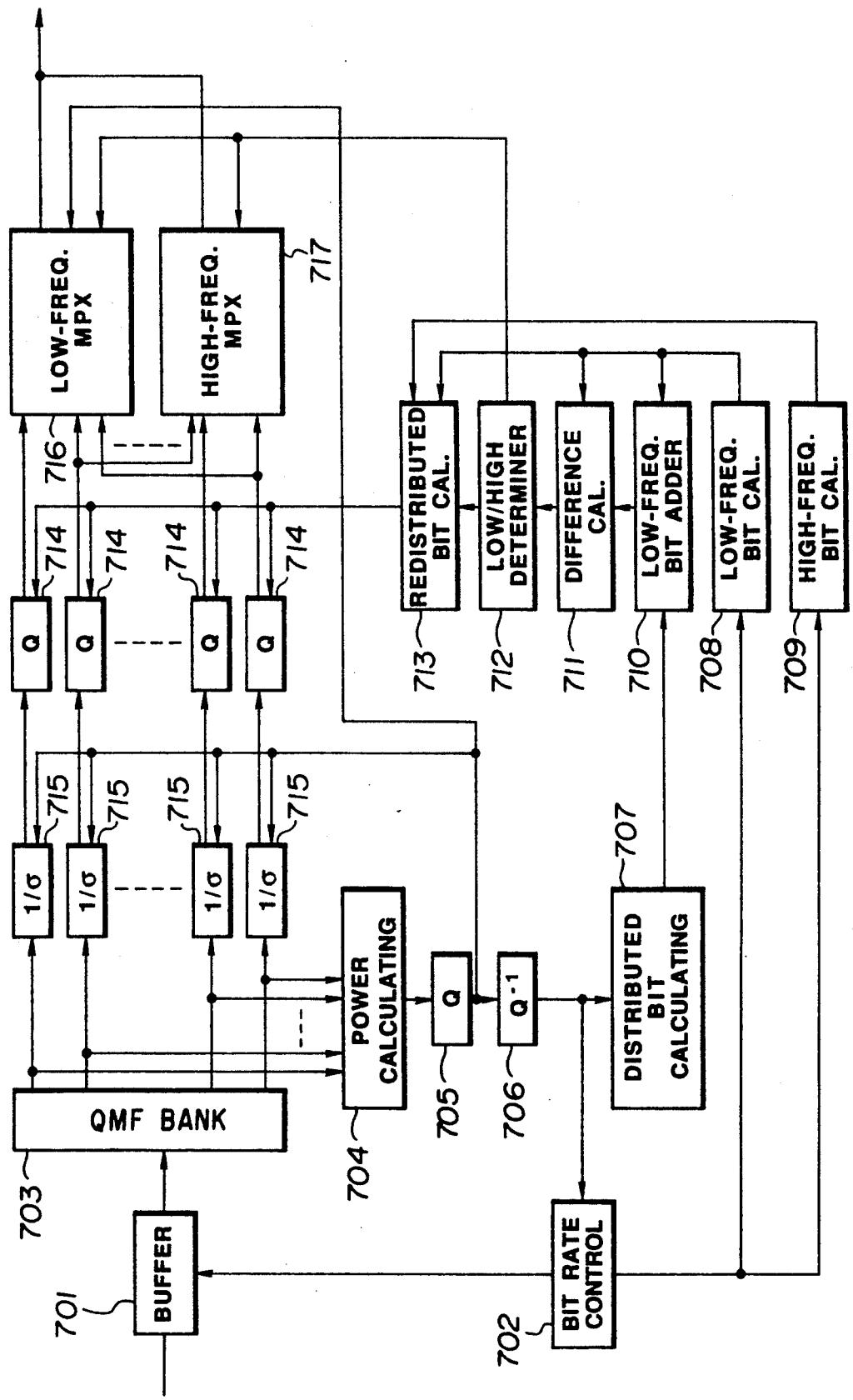
FIG. 15 is a block diagram of a transmitter in one embodiment of the variable rate encoding and communicating apparatus according to the present invention.

FIG. 15 is a block diagram of a transmitter of one embodiment of the inventive variable rate encoding and communicating apparatus. In FIG. 15, input buffer 701 receives a series of digital voice signals and stores them. Bit rate control unit 702 performs the operation shown by the flowchart of FIG. 5, so that the series of voice signals in input buffer 701 is cut out in sample units, and the cut-out signals are sent to QMF bank 703. QMF bank 703 divides the voice signal into 8 bands to thereby output 8 corresponding band signals. Electric power calculating unit 704 receives the respective band signals and calculates the respective RMS values $\sigma.k$ of the bands which are delivered through quantizer 705 or dequantizer 706 to bit rate control unit 702, which repeats required operations on the basis of the respective given RMS values $\sigma k$ of the bands to calculate a encoded bit rate which ensures a substantially constant communication quality to thereby cause input buffer 701 to output a voice signal having the number of sample units corresponding to the bit rate.

Figure 16:
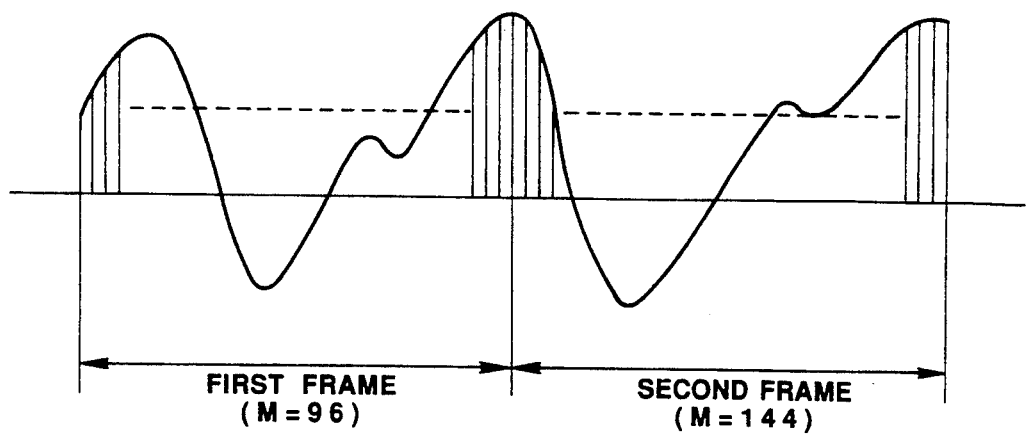
FIG. 16 shows one example of a voice signal in the embodiment.

In the present embodiment, the above operations are subsequently performed for two cells, the voice signal in input buffer 701 is cut out in the respective lengths for those two cells. FIG. 16 illustrates voice signals of first and second frames cut out for the two cells. If one sample unit is assumed to be composed of 24 samples, the voice signal of first frame is composed of 4 sample units or 96 samples while the voice signal of the second frame is composed of 6 sample units or 144 samples.

If it is assumed that the number of bits N on one cell used to quantize a voice signal is 47 bytes = 376 bits, and the number of bits S used to quantize the RMS value $\sigma k$ of one band is 4 bits and hence the number of bits used to quantize the RMS values $\sigma.k$ of 8 bands is 32 bits, the bit rate R per sample is calculated for the respective first and second frames by $$R1 = \frac{376 - 32}{96} = 3.58 \quad (15)$$

$$R2 = \frac{376 - 32}{144} = 2.38 \quad (16)$$

where

R1 is the bit rate per sample in the first frame; and
R2 is the bit rate per sample in the second frame.

When distributed bit calculating unit 707 receives the respective RMS values $\sigma k$ and bit rates of the corresponding bands in the first and second frames, it calculates the distributed bit values Rk of the corresponding bands for the respective first and second frames on the basis of equation (5). Distributed bit calculating unit 707 corrects the respective distributed bit values Rk of the corresponding bands for every first and second frame to obtain the corrected distributed bit values Rk' of the corresponding bands.

The respective corrected distributed bit values Rk' of the corresponding bands in the first frame are calculated such that the sum of the respective corrected distributed bit values Rk' satisfy int(R1·8)=28 and such that the value obtained from the next equation (17) is minimized. The distributed correction bit values Rk' of the corresponding bands in the second frame are calculated such that the sum of the respective distributed correction bit values Rk' satisfy int(R2·8)=19 and that the value obtained from equation (17) is minimized:

$$\sum_{k=1}^{Mb} |Rk - Rk'| \quad (17)$$

A more specified sample of a process for correcting the respective distributed bit values Rk of the corresponding bands is shown in the flowchart of FIG. 7.

Therefore, by the calculations described so far, the distributed bits required for quantizing the 8 bands are obtained for the respective first and second frames.

In the present embodiment, the 8 bands of the first frame are divided into two (or low and high) frequency region groups, the 8 bands of the second frame are divided into two (or low and high) frequency region groups, the respective band signals of the first and second frames belonging to the low frequency region group are encoded and incorporated into one cell, the respective band signals of the first and second frames belonging to the high frequency region group are encoded and incorporated into one cell, and the low and high frequency region groups are sent in the corresponding cells.

The calculations required for these operations will be described hereinafter. When low frequency region distributed bit calculating unit 708 receives the respective numbers of samples of the first and second frames from bit rate control unit 702, it performs the following operation shown in equation (18) on the basis of the numbers of samples of the first and second frames to calculate a low frequency region distributed value K indicative of the number of bits used to quantize the respective band signals of the low frequency region groups of the corresponding first and second frames:

$$K = \text{int}\left[\frac{4(N - 2S')}{96}\right] \quad (18)$$

where N is the number of bits in a cell of the low frequency region group used to quantize the voice signal; and S' is the number of bits used to quantize the respective RSM values $\sigma.k$ and the number of samples of the corresponding bands in one frame, where the low frequency region distributed value K of the first frame is 12 and that of the second frame is 8.

When high frequency region distributed bit calculating unit 709 receives from bit rate control unit 702 the respective numbers of samples of the first and second frames, it performs an operation indicative of the following equation (19) on the basis of the respective numbers of samples of the first and second frames to calculate a high frequency region distributed value J indicative of the number of bits used to quantize the respective band signals of the high frequency region group of the respective first and second frames:

$$J = \text{int}\left[\frac{4 \cdot N}{144}\right] \quad (19)$$

where the high frequency region distributed value J of the first frame is 15 and that of the second frame is 10. Low-frequency region distributed bit adding unit 710 receives information on low frequency region distributed values K=12, 8 of the first and second frames from low-frequency region distributed bit calculating unit 708 and information on distributed correction bit values Rk' of the corresponding bands in the first and second frames from distributed bit calculating unit 707. In response to this, low frequency region distributed bit adding unit 710 adds up the respective distributed correction bit values Rk' of the corresponding bands in the first frame, starting with the distributed correction bit value Rk' of the first band having the lowest frequency until the sum W exceeds the low-frequency region distributed value K=12 of the first frame at which time the sum W is calculated and determines the ith band which is given the distributed correction bit value Rk' added up last. Similarly, the distributed correction bit values Rk' of the corresponding bands in the second frame are sequentially added up, starting from the distributed correction bit value Rk' of the first band having the lowest frequency. When this sum W exceeds the low-frequency region distributed value K=8 in the second frame, the adding unit 710 calculates the sum W and determines the ith band which is given a distributed correction bit value Rk' added up last. The respective sums W calculated for the first and second frames are reported to difference calculating unit 711, and the distributed correction bit values Rk' of the respective bands and the respective ith bands of the first and second frames are reported to low-/high-frequency region determiner 712 through a difference calculating unit 711.

Difference calculating unit 711 receives information on low-frequency region distributed values k=12, 8 of the first and second frames from low-frequency region distributed bit calculating unit 708. Difference calculating unit 711 calculates the difference Δ between the sum W and the low-frequency region distributed value K for every first and second frame and reports the respective differences Δ to low-/high-frequency region determiner 712, which compares the respective differences Δ for every first and second frame with a predetermined threshold value thr. If the difference Δ≦the threshold value thr, the low-/high-frequency region determiner 712 determines that up to the ith band should belong to a low-frequency region group and that the bands having higher ordinal numbers larger than the ith should belong to a high-frequency group. If the difference Δ>the threshold value thr, the low-/high-frequency region determiner 712 determines that up to the (i-l)th band should belong to the low-frequency region group and that the ith bands or bands having higher ordinal numbers should belong to the high frequency region group.

For example, for the first frame, the sum W=16 when up to the distributed correction bit value Rk' of the third band is added up. If the sum first exceeds the distributed low-frequency region value K=12, the difference Δ is 16−12=4. If the threshold value thr is 2, the difference Δ "4" is greater than threshold value thr "2", so that up to the (3−1) bands or second band is determined to belong to the low-frequency region group and the 3rd–8th bands is determined to belong to the higher frequency region group. For the second frame, the sum W=9 when up to the distributed correction bit value Rk' of the third band is added up. If the sum first exceeds the low-frequency region distributed value K=8, the difference is 9−8=1 and the difference Δ "1" is equal to or less than threshold value thr "2", so that up to the third band is determined to belong to the low-frequency region group and the 4th–8th bands are determined to belong to the high frequency region group.

If the distributed correction bit values Rk' of the first-eighth bands are sequentially added up, starting with that of the first band of the lowest frequency, and up to the band where the sum W becomes close to the low-frequency region distributed value K is determined to belong to the low-frequency region group, the bands belonging to the low-frequency region group and to the high-frequency region group can be determined appropriately in accordance with the distributed bits even if the distributed bits change in the respective frames.

If the first to Lth bands of the first frame belong to the low-frequency region group, the respective distributed correction bit values Rk' of the first to Lth bands and the (L+1) to 8th bands belonging to the high-frequency region group are reported from low-/high-frequency region determiner 712 to redistributed bit calculating unit 713. Similarly, for the second frame, the respective distributed correction bit values Rk' of the first to Lth bands belonging to the low-frequency region group and of the (L+1)th to 8th bands belonging to the high-frequency region group are reported from low-/high-frequency region determiner 712 to redistributed bit calculating unit 713.

Redistributed bit calculating unit 713 receives information on the respective distributed low-frequency values K of the first and second frames from low-frequency region distributed bit calculating unit 708 and on the respective high-frequency region distributed values J of the first and second frames from high-frequency region distributed bit calculating unit 709. Redistributed bit calculating unit 713 calculates the respective low-frequency region distributed correction bit values RL on the basis of the respective distributed correction bit values Rk' of the first to Lth bands belonging to the low-frequency region group for the first and second frames, and also calculates the high-frequency region distributed correction bit values RH on the basis of the respective distributed correction bit values Rk' of the (L+1)th to 8th frequency bands belonging to the high-frequency region group. The respective low-frequency region distributed bit values RL of the low-frequency region group are calculated such that the sum of the respective distributed correction bit values RL of the low-frequency region group satisfies the low-frequency region distributed value K and that the value obtained from the following equation (20) is minimized:

$$\sum_{L=1}^{L} |RL - Rk'| \quad (20)$$

The respective high-frequency region distributed correction bit values RH of the high frequency region group are calculated such that the sum of the respective high-frequency region distributed correction bit values RH satisfies the high-frequency region distributed value J and that the value obtained from the following equation (21) is minimized:

$$\sum_{H=L+1}^{8} |RH - Rk'| \quad (21)$$

If the respective band signals of the first to Lth bands of the first frame are quantized with the respective numbers of bits corresponding to the low-frequency region distributed correction bit values RL of the first frame, and if the respective band signals of the first to Lth bands of the second frame are quantized with the respective numbers of bits corresponding to the low-frequency region distributed correction bit values RL of the second frame, all the resulting codes can be just accommodated in the cell for the low-frequency region group and the S/N is greatly improved. If the band signals of the (L+1)th to 8th bands of the first frame are quantized with the respective numbers of bits corresponding to the high-frequency region distributed correction bit values RH of the first frame, and if the band signals of the (L+1)th to 8th bands of the second frame are quantized with the respective numbers of bits corresponding to the respective high-frequency region distributed correction bit values RH of the second frame, all the resulting code signals can be just accommodated in the cell for the high-frequency region group and the S/N is greatly improved.

When the voice signal of the first frame is encoded, the low-frequency distributed correction bit values RL of the first frame are reported to the respective band quantizers 714 corresponding to the first to Lth bands belonging to the low-frequency region group, and the high-frequency region distributed correction bit values RH of the first frame are reported to the respective band quantizers 714 corresponding to the (L+1)th to 8th bands belonging to the high-frequency group. Similarly, when the voice signal of the second frame is encoded, the low-frequency region distributed correction bit values RL of the second frame are reported to the respective band quantizers 714 corresponding to the first to Lth bands, and the high-frequency distributed correction bit values RH of the first frame are reported to the respective band quantizers 714 corresponding to the (L+1)th to 8th bands.

The respective band signals sent from QMF bank 703 are normalized by the corresponding normalizers 715 for every first and second frame and the normalized signals are input to the corresponding band quantizers 714.

When band quantizer 714 receives information on low-frequency region distributed correction bit value RL, it quantizes the signal from normalizer 715 with the number of bits corresponding to RL to thereby form codes of the bands belonging to the low-frequency region group. When band quantizer 714 receives information on high-frequency distributed correction bit value RH, it quantizes the signal from normalizer 715 with the number of bits corresponding to RL to thereby form codes of the bands belonging to the high-frequency group.

Low-frequency region multiplexing unit 716 receives information on the first to Lth bands belonging to the low-frequency region group from low-/high-frequency region determiner 712 for every first and second frame and receives the respective codes from band quantizers 714 corresponding to those bands. High-frequency multiplexing unit 717 receives information on the (L+1)th to 8th bands belonging to the high-frequency region group from low-/high-frequency region determiner 712 for every first and second frame and receives the respective codes from respective band quantizers 714 corresponding to those bands.

Low-frequency region multiplexing unit 716 obtains from quantizer 705 the respective RMS values $\sigma k$ of the bands in the first frame, the number of samples (=96) of the first frame, and the respective RMS values $\sigma k$ of the bands in the second frame, the number of samples (=144) of the second frame, and accommodates in one cell these pieces of data together with the codes of the respective bands belonging to the low-frequency region groups in the first and second frames to thereby form the cell in the low-frequency region group. This cell has a structure shown in FIG. 17 in which the first 32 bits are allocated 4 bits by 4 bits to 8 bands in the first frame to represent respective RMS values $\sigma k$ of the 8 bands. The following 32 bits are allocated 4 bits by 4 bits to 8 bands in the second frame to represent respective RMS values $\sigma k$ the 8 bands. The further following 156 bits are indicative of an arrangement of the codes of the first to Lth bands in the first frame. The still further following 144 bits are indicative of an arrangement of the codes of the first to Lth bands in the second frame. The yet further following 4 bits are indicative of the number of samples "96" of the first frame. The last 4 bits are indicative of the number of samples "144" of the second frame. Thus the total number of bits in the cell is 372.

Figure 18:
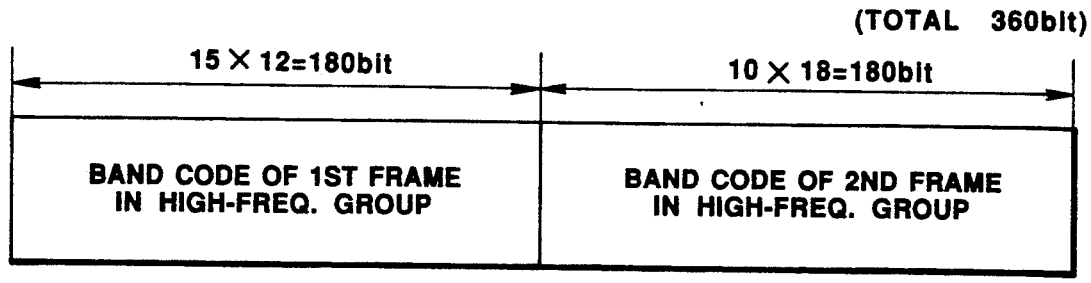
FIG. 18 shows the structure of a high frequency region side cell in the embodiment.

High-frequency region multiplexing unit 717 accommodates in one cell the codes of the respective bands belonging to the high-frequency region groups in the first and second frames to thereby form a cell for high-frequency region group which takes a structure shown in FIG. 18. The first 180 bits constitutes an arrangement of the codes of the (L+1) to 8th bands in the first frame. The following 180 bits constitute an arrangement of the codes of the (L+1)th to 8th bands in the second frame. Thus, the total number of bits in the cell is 360.

Figure 17:
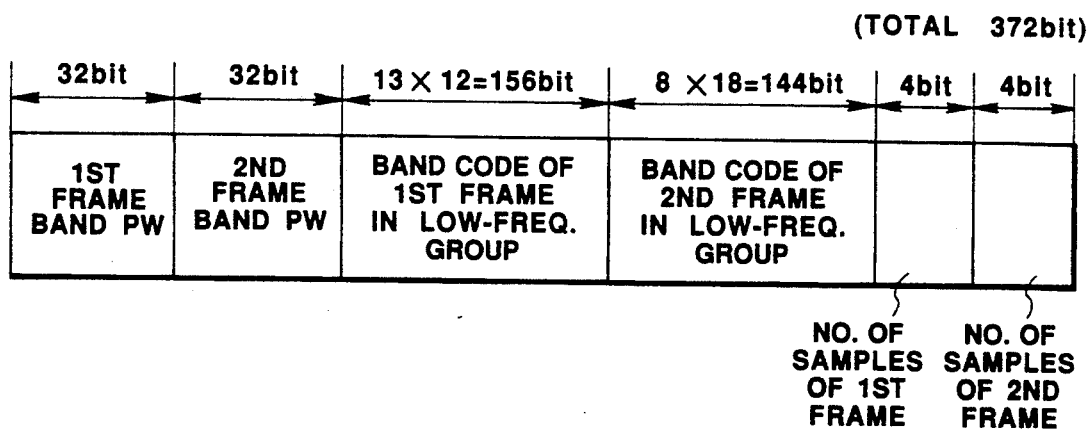
FIG. 17 shows the structure of a low frequency region side cell in the embodiment.

When low-frequency region multiplexing unit 716 forms a cell for the low-frequency group shown in FIG. 17, it sends to the receiving end the cell as having low discard priority. When high-frequency multiplexing unit 717 forms a cell for the high-frequency region group shown in FIG. 18, it sends to the receiving end the cell as having high discard priority.

Namely, the transmitter distributes the 8 bands of each of the first and second frames to the respective low-frequency and high-frequency region groups, codes the respective band signals of the low-frequency region groups in the first and second frames, incorporates the resulting codes into a single cell, and also codes the respective band signals of the high-frequency region groups in the first and second frames, incorporates the resulting codes into a single cell, and sends low- and high-frequency region cells as having low and high discard priorities, respectively.

Even if the high-frequency region cell having high discard priority is discarded in the communication network, the cell having low discard priority has a high probability of being transmitted to the receiver without being discarded.

Figure 19:
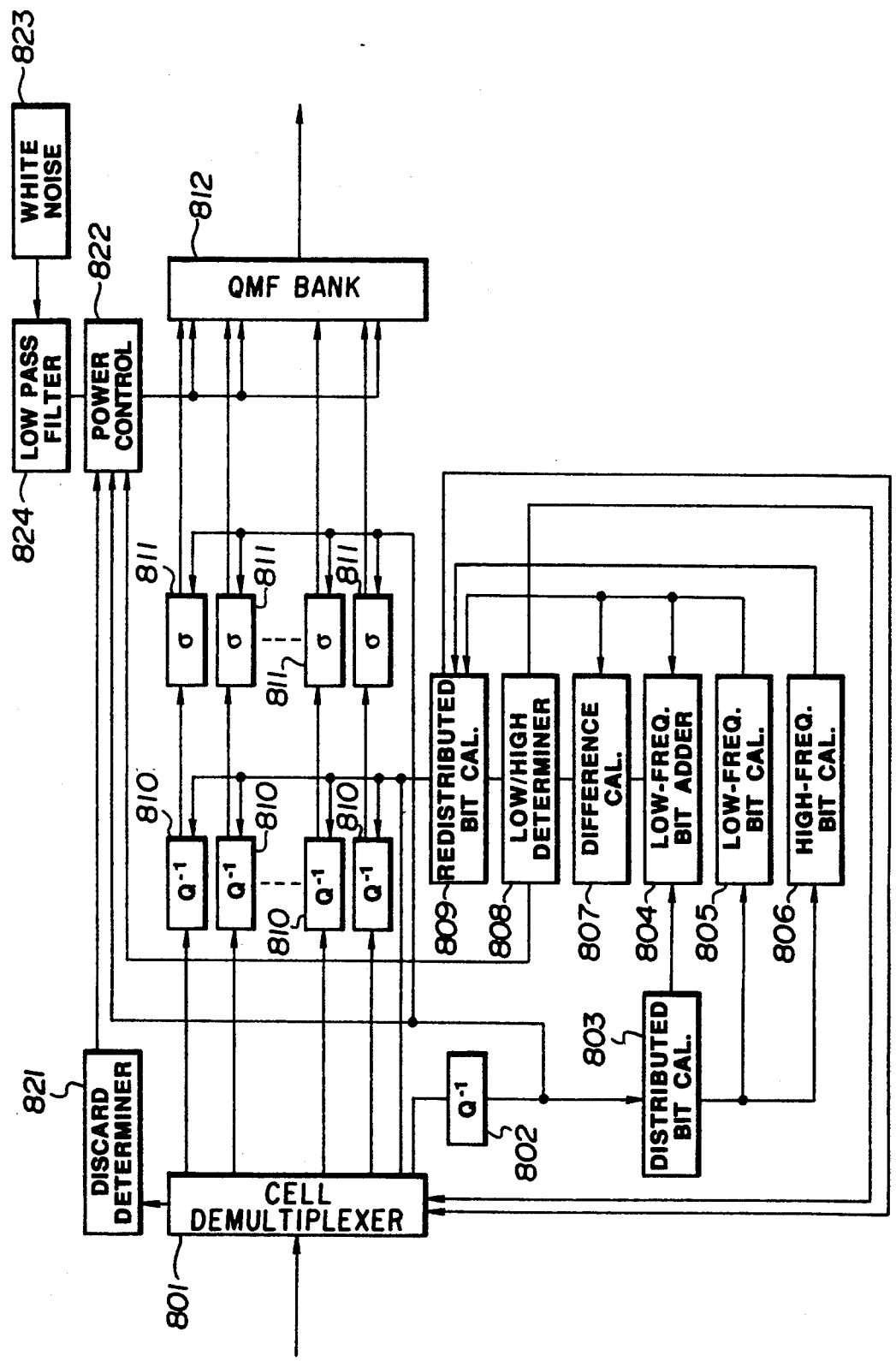
FIG. 19 is a block diagram of a receiver in the present embodiment.

FIG. 19 is a block diagram of the receiver in the present embodiment. In FIG. 19, cell demultiplexer unit 801 receives the low and high frequency region side cells sequentially. First, the cell demultiplexer unit 801 extracts from the low-frequency region side cell the respective codes (32 bits) indicative of the corresponding band RMS values $\sigma k$ in the first frame, codes (32 bits) indicative of the respective band RMS values $\sigma k$ in the second frame, and codes (4 bits each) indicative of the respective number of samples of the first and second frames and applies these codes to dequantizer 802. Dequantizer 802 dequantizes those codes and the RMS values $\sigma k$ of the corresponding bands in the first and second frames and reports the respective numbers of samples in the first and second frames to distributed bit calculating unit 803.

Distributed bit calculating unit 803 performs an operation similar to that performed by the transmitting end on the basis of the respective RMS bands $\sigma k$ and the respective numbers of samples of the corresponding bands in every first and second frames to obtain the bit rates, calculates the respective distributed bit values Rk of the corresponding bands, and then the distributed correction bit values Rk'. The respective distributed correction bit values Rk' of the corresponding first and second frames are reported to low-frequency region distributed bit adding unit 804.

Low-frequency region distributed bit calculating unit 805 receives from distributed bit calculating unit 803 the respective numbers of samples of the first and second frames, performs an operation similar to that performed by the transmitting end on the basis of the respective numbers of samples to obtain the low-frequency region distributed values K (=12, 8) of the first and second frames. High-frequency region calculating unit 806 receives the respective numbers of samples of the first and second frames, and obtains the high-frequency region distributed values J (=15, 10) of the first and second frames on the basis of the respective numbers of the samples, like low-frequency region distributed bit calculating unit 805.

Low-frequency region distributed bit adding unit 804 receives information on the low-frequency region distributed values K=12, 8 of the first and second frames, respectively, from the low-frequency region distributed bit calculating unit 805, the distributed correction bit values Rk' of the respective bands in the first and second frames from distributed bit calculating unit 803, performs an operation similar to that performed by the transmission end to thereby add up distributed correction bit values Rk' of the respective bands in the first frame to obtain the sum W exceeding the low-frequency region distributed value K=12, and determines the ith band which is given the finally added-up distributed correction bit value Rk'. It also adds up distributed correction bit values Rk' of the respective bands in the second frame to obtain the sum W exceeding the low-frequency region distributed value K=18, and determines the ith band which is given the finally added-up distributed correction bit value Rk'. The respective sums W obtained for the first and second frames are reported to difference calculating unit 807, the respective distributed correction bit values Rk' and respective ith bands for every first and second frames are reported to low-/high-frequency region determiner 808 through difference calculating unit 807.

Difference calculating unit 807 receives information on the respective low-frequency region distributed values K=12, 8 from low-frequency region distributed bit calculating unit 804, performs an operation similar to that performed by the transmission end to thereby calculate the difference Δ between the sum W and the low-frequency region distributed value K for every first and second frame, and reports the respective differences Δ for the first and second frames to low-/high-frequency determiner 808. Determiner 808 compares the respective differences Δ with the predetermined threshold value thr for every first and second frames. If the difference Δ is not larger than the threshold value thr, it determines up to the ith frequency band as belonging to the low-frequency region group while if the differences Δ are larger than the threshold value thr, it determines up to (i−1)th band as belonging to the low-frequency group. Thus, low-/high-frequency determiner 808 determines the first to Lth bands for the first and second frames as belonging to the low-frequency region group and the (L+1) to 8th bands as belonging to the high-frequency region group.

Redistributed bit calculating unit 809 receives information on the respective distributed correction bit values Rk' of the bands belonging to the low-frequency and high-frequency region groups in each of the first and second frames from low-/high-frequency region determiner 808, information on the respective low-frequency region distributed values K of the first and second frames from low-frequency region distributed bit calculating unit 805, and information on the high-frequency region distributed values J of the first and second frames from high-frequency region distributed bit calculating unit 806. Redistributed bit calculating unit 809 performs an operation similar to that performed by the transmission end for every first and second frames to thereby obtain the respective low-frequency region distributed correction bit values RL on the basis of the respective distributed correction bit value Rk' of the corresponding bands belonging to the low-frequency region group and to obtain the respective high-frequency region distributed correction bit values RH on the basis of the distributed correction bit values Rk' of the corresponding bands belonging to the high-frequency region group.

When the codes of the respective bands in the first frame are dequantized, the low-frequency distributed correction bit values RL of the corresponding bands belonging to the low-frequency region group in the first frame are reported to the respective band dequantizers 810 corresponding to the bands. The high-frequency region distributed correction bit values RH of the corresponding bands belonging to the high-frequency group in the first frame are reported to the respective band dequantizers 810 corresponding to the bands. Subsequently, when the codes of the respective bands in the second frame are dequantized, the low-frequency region distributed correction bit values RL of the corresponding bands belonging to the low-frequency region group in the second frame are reported to the respective band dequantizers 810 corresponding to the bands. The high-frequency region distributed correction bit values RH of the corresponding bands belonging to the high-frequency region group in the second frame are reported to the respective band dequantizers 810 corresponding to the bands.

The respective low-frequency region distributed correction bit values RL and the respective high-frequency region distributed correction bit values RH for every first and second frames are reported from redistributed bit calculating unit 809 to cell demultiplexer unit 801. Cell demultiplexer unit 801 calculates the respective positions of the first to Lth bands in the first and second frames for the low-frequency region cell shown in FIG. 17 and the respective position of the codes of the (L+1)th to 8th bands in every first and second frame for the high-frequency region cell shown in FIG. 18 on the basis of the respective low-frequency and high-frequency region distributed bit values RL and RH of the first and second frames, and extracts the codes of the first to eighth bands in the first and second frames.

The thus extracted codes of the first to 8th bands in the first frame are sent to the respective band dequantizers 810 corresponding to the bands. Subsequently, the thus extracted codes of the first to 8th bands in the second frame are sent to the respective bands dequantizers 810 corresponding to the bands.

When the respective band dequantizers 810 receive the respective codes of the corresponding bands in the first frame, it dequantizes those codes on the basis of the low-frequency region distributed correction bit values RL of the first frame and the high-frequency region distributed correction bit values RH reported by redistributed bit calculating unit 809 and adds the thus obtained signals in the first frame to the respective dequantizers 811. Subsequently, when the band dequantizers 810 receive the respective codes of the corresponding bands in the second frame, it dequantizes those codes on the basis of the low-frequency region distributed correction bit values RL of the second frame and the high-frequency region distributed correction bit values RH reported by redistributed bit calculating unit 809 and applies the thus obtained signals in the second frame to the respective dequantizers 811.

When the respective dequantizers 811 receives the respective signals in the first frame from the corresponding band dequantizers 810, they dequantize those signals on the basis of the respective band RMS values $\sigma k$ in the first frame from dequantizer 802 and apply the resulting band signals in the first frame to QMF bank 812. Subsequently, when the respective dequantizers 811 receive the respective signals in the second frame from the corresponding band dequantizers 810, they dequantize those signals on the basis of the respective band RMS values $\sigma k$ in the second frame from dequantizer 802 and apply the resulting band signals in the second frame to QMF band 812.

QMF bank 812 synthesizes the respective band signals for every first and second frame and sequentially outputs as a decoded signal the resulting entire band signal for the two frames.

Since the low-frequency region side cell with low discard priority is transmitted from the transmitting end to the receiving end, they are not almost discarded. Since the high-frequency region side cell has high discard priority, they can be discarded intermediate the communication network. In this case, the receiving end receives only the low-frequency region side cell and not the high-frequency region side cell.

The operation of the receiving end in such a state will be described below. First, discard determiner 821 determines whether the high-frequency region side cell subsequent to the low-frequency frequency region side cell has been received or not by monitoring cell demultiplexer unit 801. If not, the discard determiner 821 informs power control unit 822 that the high-frequency region side cell is discarded. If the above-mentioned time stamp is inserted into each of the low-frequency and high-frequency region side cells in the transmitting end, the discard determiner 821 is able to determine whether the high-frequency region side cell is discarded, by receiving the time stamp of the cell from cell demultiplexer unit 801.

Power control unit 822 receives the respective band RMS values $\sigma k$ in each of the first and second frames from dequantizers 802, and the (L+1) to 8th bands belonging to the high-frequency region group for every first and second frame from low-/high-frequency region determiner 808. When power control unit 822 is informed that the high-frequency region side cell is discarded, it selects the RMS values $\sigma k$ of the (L+1)th to 8th bands belonging to the high-frequency region group from the RMS values $\sigma k$ of the respective bands in the first frame, and the RMS values $\sigma k$ of the (L+1) to 8th bands belonging to the high-frequency region group from the RMS values $\sigma k$ of the corresponding bands in the second frame. Even if the high-frequency region side cell is discarded and unless the low-frequency region side cell is discarded, the respective RMS values $\sigma k$ of the corresponding bands in each of the first and second frames can be obtained on the basis of the data contained in the low-frequency region side cell. By sequentially performing the above-mentioned operations on the low-frequency region side cell, the power of the respective bands belonging to the high-frequency region groups for every first and second frame can be obtained.

While noise calculating unit 823 generates white noise having a Gaussian distribution and sends a signal indicative of the white noise, which is then passed to a low pass filter 824 where the white noise signal is multiplied by a transfer function of $H(Z)=1+0.4\cdot Z^{-1}$ and the resulting signal is input to power control unit 822.

When the respective band signals in the first frame are synthesized, power control unit 822 forms the respective white noise signals having the corresponding electric power values which are P (=0.6) times as large as the RMS values $\sigma K$ of the (L+1) to 8th bands belonging to the high-frequency region group in the previously selected first frame and sends these white noise signals to QMF bank 812 instead of the respective band signals corresponding to the (L+1)th to 8th bands in the first frame. Subsequently, when the respective band signals in the second frame are synthesized, power control unit 822 forms the respective white noise signals having the corresponding power values which are P times as large as the RMS values $\sigma K$ of the (L+1) to 8th bands belonging to the high-frequency region group in the previously selected second frame and sends these white noise signals to QMF bank 812 instead of the respective band signals corresponding to the (L+1)th to 8th bands in the second frame.

When QMF bank 812 receives from power control unit 822 the respective white noise signals corresponding to the bands belonging to the high-frequency region group in the first frame, it receives from the respective dequantizers 811 the respective corresponding band signals corresponding to the bands belonging to the low-frequency region group in the first frame to synthesize the respective white noise signals and band signals and outputs the resulting entire band signal as the first frame decoded signal. Subsequently, when QMF bank 812 receives the respective white noise signals corresponding to the bands belonging to the high-frequency region group in the second frame, it receives the corresponding band signals belonging to the low-frequency region group in the second frame to synthesize the respective white noise signals and band signals and outputs the resulting entire band signal as the second frame decoded signal. As just described, when the high-frequency region side cell is discarded, the respective band signals belonging to the low-frequency region group for every first and second frame are obtained from the low-frequency region side cell, the respective band signals belonging to the high-frequency region group for the respective first and second frames and which were to be obtained from the discarded high-frequency region side cell are interpolated on the basis of a version of the white noise signal output from a low pass filter and the respective band signals and white noise signals are synthesized for every first and second frame. Therefore, even if the high-frequency region side cell is discarded, the entire band signal having spectral components similar to those of the entire original band signal in the transmission end can be recovered to thereby greatly reduce a deterioration in the communication quality.

The reason why a lower discard priority is given to the low-frequency region side cell rather than to the high-frequency region side cell is that if the low-frequency region of a voice signal is accurately reproduced, sufficient telephonic communication is achieved because the human voice has an important feature on the low-frequency region according to voice analysis by Foltman et al. If a great deterioration in the communication quality is a matter of indifference, the contents of telephonic communication can be caught by only synthesizing the respective band signals belonging to the low-frequency region group even if no respective band signals belonging to the high-frequency region group are interpolated.

While in the present embodiment the respective band signals are classified into two groups of the low-frequency and high-frequency sides, arrangement may be such that the respective band signals are classified into three or more groups, that one cell is formed for every three or more groups and that those cells are communicated with corresponding discard priorities. The present invention is not limited to the voice signal and is, of course, applicable to other kinds of signals to be communicated. Alternatively, arrangement may be such that the signals to be communicated are divided into appropriate bands in accordance with the features of those signals, that the resulting respective signals are divided into two or more groups, that cells are formed one for every two or more groups and that these cells are communicated with corresponding discard priorities.

While in the above embodiment information units of a fixed length called a cell have been illustrated, it is to be noted that the present invention is also applicable to information units having a variable length called a packet, of course. In this case, arrangement may be such that the respective codes corresponding to the band signals are divided into two or more groups, that packets are formed one for each group, and that these packets are communicated with different discard priorities.

What is claimed is:

1. A variable rate encoding and communicating apparatus comprising:
    a transmitter which samples an input signal, compresses and encodes the sampled input signal to form compressed data, integrates the compressed data into a cell, and transmits the cell through a network; and
    a receiver which receives the cell transmitted from said transmitter through the network, decodes the compressed data in the cell to reproduce the input signal,
    said transmitter being adapted to estimate a signal-to-noise ratio (SNR) of the input signal reproduced in said receiver and to adjust a sample size of the input signal so that the SNR becomes substantially a constant level, wherein
    said transmitter includes:
    sampling means for sampling the input signal by a designated sample size;
    frequency band dividing means for dividing a frequency band of the sampled input signal into a predetermined number of subbands to form respective frequency band signals in the respective subbands;
    power calculating means for calculating an electric power level of each frequency band signal;
    bit-rate control means for computing the SNR of the sampled input signal reproduced in said receiver on the basis of a ratio of a sample size of the sampled input signal and the number of bits utilized for encoding each frequency band signal in the cell and the electric power of each frequency band signal as parameters, and for instructing said sampling means to increase the sample size of the input signal until the SNR substantially reaches a predetermined value;
    first bit distribution calculating means, when the sample size of the input signal is increased until the SNR substantially reaches the predetermined value, for distributing the number of bits in the cell utilized for encoding each frequency band signal to each subband in accordance with the electric power of each frequency band signal calculated by said power calculating means at the time the SNR substantially reaches the predetermined value to determine the number of bits utilized for encoding each frequency band signal in each subband;
    encoding means, when the sample size of the input signal is increased until the SNR substantially reaches the predetermined value, for encoding each frequency band signal formed by the frequency band dividing means at the time the sample size is increased by the number of bits distributed to each subband to form codes representing the respective frequency band signals; and
    transmitting means for integrating into the cell the codes representing the frequency band signals formed by said encoding means, the sample size of the input signal, and data indicative of the electric power of each frequency band signal, and for transmitting the cell to said receiver through the network, and
    wherein said receiver includes:
    cell decomposing means, when receiving the cell through the network, for extracting from the cell the codes representing the respective frequency band signals, the sample size of the input signal, and the data indicative of the electric power of each frequency band signal;
    second bit distribution calculating means for calculating the numbers of bits distributed to each subband in accordance with the electric power of each frequency band signal indicated by the data extracted by said cell decomposing means;
    decoding means for decoding the codes representing the respective frequency band signals extracted by said cell decomposing means in accordance with the bit numbers distributed to each subband determined by said second bit distribution calculating means to reproduce the respective frequency band signals; and
    synthesizing means for synthesizing the respective frequency band signals reproduced by said decoding means to reproduce the input signal.

2. A variable rate encoding and communicating apparatus according to claim 1, wherein
    said transmitter further comprises time stamp calculating means for adding the sample size integrated in each cell to determine respective time stamps each time a plurality of cells are transmitted through the network to said receiver,
    wherein said transmitting means integrates the respective time stamps calculated by said time stamp calculating means into the respective cells,
    and wherein said receiver further comprises:
    cell discard detecting means for detecting a cell which is discarded on the network from among the respective cells on the basis of the sample size and the time stamp integrated in each cell, each time said cell discard detecting means receives a cell, wherein said cell decomposing means extracts the sample size and the time stamp integrated in each cell and provides the sample size and the time stamp to said cell discard detecting means.

3. A variable rate encoding and communicating apparatus according to claim 2, wherein said receiver further comprises interpolation reproducing means for interpolating and reproducing a portion of the input signal to be reproduced from a discarded cell on the basis of respective portions of the input signals reproduced from cells positioned before and behind the discarded cell, when the cell discarded on the network is detected by said cell discard detecting means.

4. A variable rate encoding and communicating apparatus according to claim 1, wherein an identification signal for identifying whether the input signal is a voice signal is provided to said transmitter together with the corresponding input signal, wherein said frequency band dividing means has a first division mode for voice signals and a second division mode for non-voice signals, wherein the first and second division modes are used for dividing the frequency band of the sampled input signal into a predetermined plurality of subbands, and wherein said transmitter further comprises voice judging means for judging whether the input signal is a voice signal on the basis of the identification signal, for setting said frequency band dividing means in the first division mode when said voice judging means judges that the input signal is a voice signal, and for setting said frequency band dividing means in the second division mode when said voice judging means judges that the input signal is not a voice signal.

5. A variable rate encoding and communicating apparatus according to claim 1, wherein an identification signal for identifying whether the input signal to be reproduced by said receiver is a voice signal, is provided to said receiver together with a received cell, and wherein said synthesizing means has a first synthesizing mode for a voice signal and a second synthesizing mode for a non-voice signal wherein the first and second synthesizing modes are used for synthesizing the respective frequency band signals reproduced by said decoding means, said receiver further comprises voice judging means for judging whether the input signal is a voice signal on the basis of the identification signal, for setting said synthesizing means in the first synthesizing mode when said voice judging means judges that the input signal is a voice signal, and for setting said synthesizing means in the second synthesizing mode when said voice judging means judges that the input signal is not a voice signal.

6. A variable rate encoding and communicating apparatus comprising:

a transmitter which samples an input signal, compresses and encodes the sampled input signal to form compressed data, integrates the compressed data into a cell, and transmits the cell through a network; and a receiver which receives the cell from said transmitter through the network, decodes the compressed data in the cell to reproduce the input signal, said transmitter being adapted to estimate a signal-to-noise ratio (SNR) of the input signal reproduced in said receiver and to adjust a sample size of the input signal so that the SNR becomes substantially a constant level, wherein said transmitter includes:

sampling means for sampling the input signal by a predetermined sample size;

frequency band dividing means for dividing a frequency band of the sampled input signal into a predetermined number of subbands to form respective frequency band signals in the respective subbands;

power calculating means for calculating an electric power level of each frequency band signal;

bit-rate control means for computing the SNR of the sampled input signal reproduced in said receiver on the basis of a ratio of a sample size of the sampled input signal and the number of bits utilized for encoding each frequency band signal in the cell and the electric power of each frequency band signal as parameters, and for determining the number of bits with which the SNR substantially reaches a predetermined value;

first bit distribution calculating means for distributing to each subband the number of bits determined by said bit-rate control means in accordance with the electric power of each frequency band signal calculated by said power calculating means, and for determining the number of bits utilized for encoding the frequency band signal in each subband;

encoding means for encoding each frequency band signal formed by said frequency band dividing means by the number of bits distributed to each subband to form codes representing the respective frequency band signals; and transmitting means for integrating into a cell the codes representing the respective frequency band signals formed by said encoding means and data indicative of the electric power of each frequency band, and for transmitting the cell to said receiver through the network, and wherein said receiver includes:

cell decomposing means, when receiving the cell through the network, for extracting from the cell the codes representing the respective frequency band signals and the data indicative of the electric power of each frequency band signal;

second bit distribution calculating means for calculating the respective numbers of bits distributed to each subband in accordance with the electric power of each frequency band signal indicated by the data extracted by said cell decomposing means;

decoding means for decoding the codes representing the respective frequency band signals extracted by said cell decomposing means in accordance with the respective numbers of bits distributed to each subband determined by said second bitrate distribution calculating means to reproduce the respective frequency band signals; and synthesizing means for synthesizing the respective frequency band signals reproduced by said decoding means to reproduce the input signal.

7. A variable rate encoding and communicating apparatus according to claim 6, wherein said transmitter further comprises time stamp calculating means for adding a predetermined sample size to determine respective time stamps each time a plurality of cells are transmitted through the network to said receiver, wherein said transmitting means integrates the time stamps calculated by said time stamp calculating means into the respective cells, and wherein said receiver further comprises cell discard detecting means for detecting a cell which is discarded on the network from among the cells on the basis of the sample size and the time stamp integrated in each cell, each time said cell discard detecting means receives each cell, wherein said cell decomposing means extracts the time stamp integrated in each cell and provides the extracted time stamps to said cell discard detecting means.

8. A variable rate encoding and communicating apparatus according to claim 7, wherein said receiver further comprises interpolation reproducing means for interpolating and reproducing a portion of the input signal to be reproduced from a cell discarded on the network by said cell discard detecting means on the basis of respective portions of the input signals reproduced from cells positioned before and behind the discarded cell, when the cell discarded on the network is detected by said cell discard detecting means.

9. A variable rate encoding and communicating apparatus according to claim 6, wherein an identification signal for identifying whether the input signal is a voice signal is provided to said transmitter together with the corresponding input signal, wherein said frequency band dividing means has a first division mode for voice signals and a second division mode for non-voice signals, wherein the first and second division modes are used for dividing the frequency band of the sampled input signal into a predetermined plurality of subbands, and wherein said transmitter further comprises voice judging means for judging whether the input signal is a voice signal on the basis of the identification signal, for setting said frequency band dividing means in the first division mode when said voice judging means judges that the input signal is a voice signal, and for setting said frequency band dividing means in the second division mode when said voice judging means judges that the input signal is not a voice signal.

10. A variable rate encoding and communicating apparatus according to claim 6, wherein an identification signal for identifying whether the input signal to be reproduced by said receiver is a voice signal, is provided to said receiver together with a received cell, and wherein said synthesizing means has a first synthesizing mode for a voice signal and a second synthesizing mode for a non-voice signal wherein the first and second synthesizing modes are used for synthesizing the respective frequency band signals reproduced by said decoding means, said receiver further comprises voice judging means for judging whether the input signal is a voice signal on the basis of the identification signal, for setting said synthesizing means in the first synthesizing mode when said voice judging means judges that the input signal is a voice signal, and for setting said synthesizing means in the second synthesizing mode when said voice judging means judges that the input signal is not a voice signal.

11. A variable rate encoding and communicating apparatus comprising:

a transmitter which samples an input signal, compresses and encodes the sampled input signal to form compressed data, divides the compressed data into two parts and integrates the divided data into first and second cells, and transmits the first and second cells through a network; and a receiver which receives the first and second cells from said transmitter through the network, decodes the compressed data in the first and second cells to reproduce the input signal, said transmitter being adapted to estimate a signal-to-noise ratio (SNR) of the input signal reproduced in said receiver and to adjust a sample size of the input signal so that the SNR becomes substantially a constant level, wherein said transmitter includes:

sampling means for sampling the input signal by a predetermined sample size;

frequency band dividing means for dividing a frequency band of the sampled input signal into a predetermined number of subbands to form respective frequency band signals in the respective subbands;

power calculating means for calculating an electric power level of each frequency band signal;

bit-rate control means for computing the SNR of the sampled input signal reproduced in said receiver on the basis of a ratio of a sample size of the sampled input signal and the number of bits utilized for encoding the respective frequency band signals in the respective cells and the electric power of each frequency band signal as parameters, and for instructing the sampling means to increase the sample size of the input signal until the SNR substantially reaches a predetermined value;

first bit distribution calculating means, when the sample size of the input signal is increased until the SNR substantially reaches the predetermined value, for distributing to each subband the number of bits in the cells utilized for encoding the respective frequency band signals in accordance with the electric power of each frequency band signal calculated by said power calculating means at a time when the SNR substantially reaches the predetermined value and, for determining the number of bits utilized for encoding the frequency band signals in the respective subbands;

dividing means for dividing all of the subbands into a low frequency-side group and a high-frequency-side group so as to integrate the number of bits determined for encoding the respective frequency band signals in the respective subbands belonging to the low-frequency-side group into the first cell and to integrate the number of bits determined for encoding the respective frequency band signals in the respective subbands belonging to the high-frequency-side group into the second cell;

encoding means for encoding the frequency band signals in the subbands belonging to the low-frequency-side group by the number of bits capable of being integrated in the first cell, for forming codes representing the respective encoding frequency band signals for encoding the frequency band signals in the subbands belonging to the high-frequency-side group by the number of bits capable of being integrated in the second cell for encoding the frequency band signals in the subbands belonging to the high-frequency-side group, and for forming codes representing the respective encoded frequency band signals; and transmitting means for integrating into the first cell the codes representing the respective frequency band signals in the subband belonging to the low-frequency-side group and the data indicative of the electric powers of the frequency band signals in all of the subbands belonging to the high-frequency-side group and the low-frequency-side group, for integrating in to the second cell the codes representing the respective frequency band signals in the subbands belonging to the high-frequency-side group, for transmitting the first-cell, with a discard priority in which a probability of being discarded on the network is low, to said receiver through the network, and for transmitting the second cell, with a discard priority in which a probability of being discarded on the network is high, to said receiver through the network, and wherein said receiver includes:

cell decomposing means, when receiving the first and second cells through the network, for extracting from the first cell the codes representing the respective frequency band signals belonging to the low-frequency-side group and the data indicative of the electric powers of the frequency band signals in all of the subbands belonging to the low-frequency-side group and the high-frequency-side group, and for extracting from the second cell the codes representing the respective frequency band signals in the subbands belonging to the high-frequency-side group;

second bit distribution calculating means for calculating the respective numbers of bits distributed to all of the subbands in accordance with the electric powers of the frequency band signals represented by the data extracted by said cell decomposing means;

decoding means for decoding the codes representing the respective frequency band signals in all of the subbands belonging to the low-frequency-side group and the high-frequency-side group extracted by said cell decomposing means in accordance with the respective numbers of bits distributed to all of the subbands determined by said second bit distribution calculating means to reproduce the respective frequency band signals; and synthesizing means for synthesizing the respective frequency band signals reproduced by said decoding means to reproduce the input signal.

12. A variable rate encoding and communicating apparatus according to claim 11, wherein said transmitting means in said transmitter sequentially transmits the first and second cells to said receiver through the network, and wherein said receiver further includes cell discard detecting means for judging whether the second cell, having a discard priority in which a probability of being discarded is high, has been discarded on the network when the second cell is not received subsequent to the first cell.

13. A variable rate encoding and communicating apparatus according to claim 12, wherein said decoding means in said receiver decodes the codes representing the frequency band signals in the subbands belonging only to the low-frequency-side group extracted from the first cell by said cell decomposing means in accordance with the number of bits distributed to the subbands determined by said second bit distribution calculating means to reproduce the respective frequency band signals, and wherein said synthesizing means synthesizes the respective frequency band signals and reproduces only low-frequency signal composites contained in the input signal.

14. A variable rate encoding and communicating apparatus according to claim 12, wherein said receiver further comprises interpolation reproducing means for artificially reproducing the respective frequency band signals in accordance with the electric powers of the frequency band signals in the subbands belonging to the high-frequency-side group represented by the data extracted from the first cell by said cell decomposing means when said cell discard detecting means judges that the second cell has been discarded on the network, wherein said decoding means decodes the codes representing the frequency band signals in the subbands belonging only to the low-frequency-side group extracted from the first cell by said cell decomposing means in accordance with the number of bits distributed to the subbands determined by said second bit distribution calculation means when said cell discard detecting means detects that the second cell has been discarded on the network to reproduce the respective frequency band signals, and wherein said synthesizing means synthesizes the frequency band signals in the subbands belonging to the high-frequency-side group artificially reproduced by said interpolation reproducing means with the frequency band signals in the subbands belonging to the low-frequency-side group reproduced by said decoding means to reproduce the input signal.

15. A variable rate encoding and communicating apparatus comprising:

a transmitter which samples an input signal, compresses and encodes the sampled input signal to form compressed data, integrates the compressed data into a cell, and transmits the cell through a network; and a receiver which receives the cell from said transmitter through the network, decodes the compressed data in the cell to reproduce the input signal, said transmitter being adapted to estimate a signal-to-noise ratio (SNR) of the input signal reproduced in said receiver and to adjust a sample size of the input signal so that the SNR becomes substantially a constant level, wherein said transmitter includes:

sampling means for sampling the input signal by a sample size by which the SNR of the input signal reproduced in said receiver becomes substantially the constant level;

frequency band dividing means for dividing a frequency band of the sampled input signal into a predetermined number of subbands to form respective frequency band signals in the respective subbands;

power calculating means for calculating an electric power level of each frequency band signal;

first bit distribution calculating means for distributing to each subband the number of bits in the cell utilized for encoding each frequency band signal in accordance with the electric power of each frequency band signal calculated by said power calculating means to determine the number of bits utilized for encoding each frequency band signal in each subband;

encoding means for encoding each frequency band signal formed by said frequency band dividing means with the number of bits distributed to each subband to form codes representing the respective frequency band signals;

time stamp calculating means for adding the sample size of the input signal and each of the past sample sizes of the input signal to determine a time stamp; and transmitting means for integrating into the cell the codes representing the respective frequency band signals formed by the encoding means, the sample size of the input signal, the time stamp, and the data indicative of the electric power of each frequency band, and for transmitting the cell to said receiver through the network, and wherein said receiver includes:

cell decomposing means, when receiving the cell through the network, for extracting from the cell the codes representing the respective frequency band signals, the sample size of the input signal, the time stamp, and the data indicative of the electric power of each frequency band signal;

second bit distribution calculating means for calculating the numbers of bits distributed to each subband in accordance with the electric power of each frequency band signal represented by the data extracted by said cell decomposing means;

decoding means for decoding the codes representing the respective frequency band signals extracted by said cell decomposing means in accordance with the number of bits distributed to the respective subbands calculated by said second bit distribution calculating means to reproduce the respective frequency band signals;

synthesizing means for synthesizing the respective frequency band signals reproduced by said decoding means to reproduce the input signal; and cell discard detecting means for detecting a cell which has been discarded on the network and which has not been received on the basis of the sample size and the time stamp represented by the data extracted by said cell decomposing means and the sample size and the time stamp extracted from a previously received cell.

16. A variable rate encoding and communicating apparatus according to claim 15, wherein said receiver further comprises interpolation reproducing means for interpolating and reproducing a portion of the input signal to be reproduced from the discarded cell on the basis of respective portions of the input signals reproduced from the respective cells positioned before and behind the discarded cell, when the cell discarded on the network is detected by said cell discard detecting means.

* * * * *